US012449439B2

(12) United States Patent
Zhuo

(10) Patent No.: US 12,449,439 B2
(45) Date of Patent: Oct. 21, 2025

(54) DOSING SET

(71) Applicant: IMOTION (SHANGHAI) PRODUCT DESIGN COMPANY LIMITED, Shanghai (CN)

(72) Inventor: Li Zhuo, Shanghai (CN)

(73) Assignee: IMOTION (SHANGHAI) PRODUCT DESIGN COMPANY LIMITED, Shanghai (CN)

( * ) Notice: Subject to any disclaimer, the term of this patent is extended or adjusted under 35 U.S.C. 154(b) by 0 days.

(21) Appl. No.: 18/725,877

(22) PCT Filed: Apr. 3, 2023

(86) PCT No.: PCT/CN2023/085965
§ 371 (c)(1),
(2) Date: Jul. 1, 2024

(87) PCT Pub. No.: WO2024/066274
PCT Pub. Date: Apr. 4, 2024

(65) Prior Publication Data
US 2025/0237671 A1 Jul. 24, 2025

(30) Foreign Application Priority Data

Sep. 29, 2022 (CN) .......................... 202211196792.5

(51) Int. Cl.
*G01N 35/10* (2006.01)
*B01L 3/00* (2006.01)

(52) U.S. Cl.
CPC .......... *G01N 35/1016* (2013.01); *B01L 3/523* (2013.01); *G01N 35/1002* (2013.01); *B01L 2200/026* (2013.01); *B01L 2200/16* (2013.01)

(58) Field of Classification Search
CPC .......... G01N 35/1016; G01N 35/1002; B01L 3/523; B01L 2200/026; B01L 2200/16; B65G 65/46; G01F 13/005
See application file for complete search history.

(56) References Cited

U.S. PATENT DOCUMENTS 5,613,624 A * 3/1997 Grzybowski ......... B01L 3/0289
222/413
2003/0136463 A1* 7/2003 Zhou ................... G01N 35/1016
222/413
(Continued)

FOREIGN PATENT DOCUMENTS

CN 102774538 A * 11/2012 ............. B65B 57/14
CN 205120595 A 3/2016
(Continued)

Primary Examiner — John McGuirk
(74) Attorney, Agent, or Firm — IPRTOP LLC

(57) ABSTRACT

A dosing set including a container and a dosing apparatus. The container can hold a reagent and be driven to rotate. The dosing apparatus includes a first channel and at least one first spiral rod. The first channel has a first channel first opening connecting with the container to allow the reagent inside the container to enter the first channel, and a first channel second opening connecting with outside of the first channel to allow the reagent to leave the first channel. The first spiral rod is within the first channel and can be driven to rotate in a first direction, to deliver the reagent from the first channel to the first channel second opening, and to control a mass flow rate of the reagent leaving through the first channel second opening by adjusting the rotational speed of itself.

17 Claims, 15 Drawing Sheets

(56) References Cited

U.S. PATENT DOCUMENTS

2006/0210435 A1    9/2006   Alavie et al.
2018/0164190 A1    6/2018   Hadayer et al.

FOREIGN PATENT DOCUMENTS

| | | | | |
|---|---|---|---|---|
| CN | 209327373 | A | 8/2019 | |
| CN | 214636520 | A | 11/2021 | |
| CN | 215005456 | A | 12/2021 | |
| CN | 215339916 | A | 12/2021 | |
| CN | 113998484 | A * | 2/2022 | ............ G01G 23/00 |
| CN | 114720189 | A * | 7/2022 | ............... G01N 1/14 |
| CN | 115508575 | | 12/2022 | |
| DE | 202011004790 | U1 * | 7/2011 | ............ G01F 11/282 |

* cited by examiner

DOSING SET

TECHNICAL FIELD

The present invention relates to the technical field of weighing and sampling, and in particular relates to a dosing set.

BACKGROUND OF THE INVENTION

It is well known that in biochemical experiments, weighing and sampling operations of reagent, especially powder reagent, need to be performed frequently. However, the weighing balance commonly used at present not only requires manual operation, but also has low accuracy and large errors. Moreover, due to the manual operation, each operation is based on human handling to get a sample, so it may be difficult to achieve desired weighing and sampling result even after several operations. In addition, due to manual operation, moving the sample may also cause the reagent to fall or scattered in the process, which will not only lead to waste of reagent, but may also cause reagent contamination. As a result, automated sampling devices are increasingly favored by experimentalists. However, existing automated sampling devices cannot realize taking samples directly from the container so causing waste of reagent and very complicated to operate.

SUMMARY OF THE INVENTION

Embodiments of the present disclosure provide a dosing set, on the one hand, by providing a dosing apparatus in a rotatable container, the sampling inside the container is realized, and the reagent contamination of the sampling from outside the container as well as the reagent falling or drifting that may be caused in the moving process of sampling are avoided, so not only the efficiency of sampling can be greatly improved, but also the waste of the reagent can be avoided. On the other hand, by providing the first channel and the first spiral rod in the dosing apparatus, not only one can adjust the rotational speed of the first spiral rod thus to control the mass flow rate of the sampling reagent, so as to accurately weigh and sample the reagent, especially the powder reagent, but also realize the automation of weighing and sampling of the reagent, thus avoiding the weighing error and contamination of the reagent brought about by the manual weighing and sampling. And on another hand, rotating the container during the process of sampling not only allows the reagent in the container to flow to prevent accumulation and caking, but also allows the reagent in the container to smoothly enter the first channel of the dosing apparatus, and then the reagent is smoothly output through the first spiral rod rotating in the first channel. And yet on another hand, it is also possible to quickly change the container and/or the dosing apparatus during the process of weighing and sampling, so as to promptly change the reagent, which saves time and labor.

The present disclosure provides the following embodiments.

Embodiments of the present disclosure provide a dosing set. The dosing set includes: a container which is adapted to hold a reagent, wherein the container is capable of being driven to rotate; a dosing apparatus, which is at least partially provided within the container, wherein the dosing apparatus includes: a first channel, wherein the first channel has a first channel first opening connecting with the container to allow the reagent inside the container to enter the first channel, and a first channel second opening which is in connection with outside of the first channel to allow the reagent to leave the first channel; and at least one first spiral rod provided within the first channel, wherein the least one first spiral rod is configured to be driven to rotate in a first direction, so as to deliver the reagent from the first channel to the first channel second opening, and wherein a mass flow rate of the reagent leaving through the first channel second opening is controlled by adjusting the rotational speed of the first spiral rod; wherein a rotational speed of the container is less than the rotational speed of the first spiral rod.

Optionally, the dosing set further includes a driving apparatus; wherein the driving apparatus includes a driving motor a second gear coaxially coupled to the driving motor, and a third gear and a fourth gear both in meshing transmission connection with the second gear; wherein the third gear is coaxially connected to the first spiral rod; wherein the fourth gear is coaxially connected to the container; wherein the second gear is adapted to rotate under the drive of the driving motor and drive the third gear to drive the first spiral rod to rotate in the first direction at the first speed, and drive the fourth gear to drive the container to rotate in the first direction at a second speed, wherein a diameter ratio of the third gear to the fourth gear is equal to a speed ratio of the second speed to the first speed.

Optionally, the container includes a container opening, and wherein the dosing set further includes a connector structure which is adapted to connect the container opening and the dosing apparatus; wherein the connector structure includes a connector penetrating along the axial direction of the container opening, and a support member and a bearing member sequentially socketed within the connector; wherein the connector is removably socketed around an outer periphery of the container opening; wherein a gap is provided between the connector and the support member to receive a sidewall of the container opening; wherein the bearing member is provided outside the dosing apparatus; wherein a first sealing ring and a second sealing ring are provided between the support member and the bearing member and between the support member and the sidewall of the container opening, respectively, so that the connector structure is seal-connected to the dosing apparatus and the container opening, respectively.

Optionally, the dosing set further includes a second channel and at least one second spiral rod provided within the second channel; wherein the second channel has a second channel first opening in connection with the first channel second opening to allow the reagent within the first channel to enter the second channel, a second channel second opening in connection with the outside to allow the reagent to leave the second channel, and a second channel third opening in connection with the container to allow the reagent to leave the second channel and return to the container; wherein the at least one second spiral rod is in meshing transmission connection with the first spiral rod to rotate in a second direction as driven by the first spiral rod, to convey the reagent within the second channel to the second channel second opening and the second channel third opening; and wherein the second direction is opposite to the first direction.

Optionally, the first channel first opening is provided in a mid-side portion of the first channel; the first channel second opening is provided in a lower side portion of the first channel; the second channel first opening is provided in a lower side portion of the second channel; the second channel second opening is provided at a bottom end of the second channel; and the second channel third opening is provided at an upper side portion of the second channel.

Optionally, a tip of the first spiral rod extends outside the first channel; wherein a tip of the second spiral rod extends outside the second channel; wherein the dosing set further includes an end-face cam coaxially connected with the tip of the first spiral rod, and a first gear coaxially connected with the tip of the second spiral rod; wherein the end-face cam is engaged to the first gear; wherein the end-face cam is adapted to be driven by the first spiral rod to rotate in the first direction and to drive the first gear to rotate the second spiral rod in the second direction when the first spiral rod rotates in the first direction.

Optionally, the dosing set further includes a top cover disposed above the first channel and the second channel, and an elastic member and a cam fitting member disposed sequentially between the top cover and the end-face cam and adapted to move only in the axis direction of the first spiral rod; wherein the cam fitting member is adapted to reciprocate along the axial direction of the first spiral rod as driven by the end-face cam when the end-face cam is rotating in the first direction, and to limit the rotation of the end-face cam in the second direction when the end-face cam is to rotate in the second direction; wherein the elastic member is adapted to compress as well as release compression under the action of the cam fitting member during rotation of the end-face cam in the first direction.

Optionally, the the end-face cam includes a pair of first beveled surfaces and a pair of first vertical surfaces at an end facing the cam fitting member; wherein the cam fitting member includes a pair of second beveled surfaces and a pair of second vertical surfaces at an end facing the end-face cam; wherein the pair of first beveled surfaces are mated with the pair of second beveled surfaces, and the pair of first vertical surfaces are mated with the pair of second vertical surfaces; wherein when the end-face cam rotates in the first direction, the pair of first vertical surfaces are away from the pair of second vertical surfaces with which they are mated, and the pair of first beveled surfaces rotate with respect to the pair of second beveled surfaces with which they are mated and push the cam fitting member to move back and forth in the axis direction of the first spiral rod; and wherein when the end-face cam is to rotate in the second direction, the pair of second vertical surfaces block the pair of first vertical surfaces with which they are mated from rotating so as to limit the end-face cam from rotating in the second direction.

Optionally, the cam fitting member includes a guide block provided on a side portion, wherein a side surface of the top cover has a groove extending in the axial direction of the first spiral rod to accept the guide block, and allow the guide block to move back and forth in the axial direction of the first spiral rod.

Optionally, the tip of the first spiral rod sequentially passes through the end-face cam and the cam fitting member and further extends above the cam fitting member; wherein the cam fitting member has a support edge provided on its inner ring; wherein elastic member includes a spring; wherein the spring is sleeved on the outside of the first spiral rod and two ends of the spring resist the inner end surface of the top cover and the support edge, respectively, so that the spring is adapted to be compressed when the cam fitting member is moved upwardly in the axial direction of the first spiral rod, and to be released from compression so that the cam fitting member moves downwardly along the axial direction of the first spiral rod, thereby enabling the cam fitting member to reciprocate along the axial direction of the first spiral rod.

Optionally, the dosing set further includes an outlet valve adapted to close as well as open the second channel second opening, wherein the outlet valve is rotationally connected to an end of the second channel proximate to the second channel second opening, and is adapted to be driven to rotate in a third direction to close the second channel second opening, and to rotate in a fourth direction to open the second channel second opening; wherein, the fourth direction is opposite to the third direction.

Optionally, the outlet valve includes a closure portion, wherein the closure portion includes a sealing member adapted to be disposed facing the second channel second opening; wherein the sealing member is adapted to move closer to and face the second channel second opening as the outlet valve rotates in the third direction, so as to be suitable for closing the second channel second opening by embedding in the second channel second opening, and the sealing member is also adapted to open the second channel second opening by disengaging from and moving away from the second channel second opening as the outlet valve rotates in the fourth direction.

Optionally, the dosing set further includes a hook block disposed on an outer side of the second channel, wherein the outlet valve includes a hook portion coupled to the closure portion and bent relative to the closure portion so that the hook portion is disposed facing a side portion of the second channel; wherein the hook portion includes a hook slot facing the hook block; wherein the hook slot is adapted to move toward the hook block when the outlet valve rotates in a third direction, and to be limited by the hook block when reaching the hook block, so that the sealing member is set facing the second channel second opening, and wherein the hook slot is also adapted to move away from the hook block when the outlet valve rotates in the fourth direction.

Optionally, when the hook slot is limited by the hook block, the hook slot abuts against a bottom of the hook block, to limit upward movement of the outlet valve.

The technical solution of embodiments of the present disclosure has beneficial effects compared to the prior art.

For example, by providing a dosing apparatus inside the rotatable container, the sampling inside the container is realized, and the reagent contamination of the sampling outside the container as well as the reagent falling or drifting that may be caused during the moving process of sampling are avoided, which not only can greatly improve the efficiency of sampling, but also can effectively avoid the waste of the reagent.

Another example is that by rotating the container during the process of sampling, not only can the reagent in the container flow to prevent accumulation and caking, but also the reagent in the container can smoothly enter the first channel of the dosing apparatus, and then the reagent can be smoothly outputted through the first spiral rod rotating in the first channel.

For another example, by causing the container to rotate at a speed less than the speed at which the first spiral rod feeds the sample, it is possible to prevent the reagent from accumulating in the first channel, and thereby enable the reagent to be smoothly output through the first spiral rod.

Another example is that by providing a connector structure in the dosing set, not only the connection position between the dosing set and the container can be limited, but also the assembly between the dosing set and the container can be facilitated and it is helpful to maintain the assembly stability.

Another example is that the container and/or the dosing apparatus can also be quickly changed during the weighing and sampling process to quickly change the reagent, saving time and labor.

As another example, by using the same driving apparatus to drive the first spiral rod and the container to rotate simultaneously, the input speed and output speed of the reagent in the first channel can be unified and coordinated, so that the output dose of the reagent can be better controlled.

For another example, two or more first spiral rods and/or second spiral rods can also be provided, so that weighing and sampling of different types of reagent with different target masses can be accommodated.

For example, since the volume of the first channel and the second channel and the size of each of its openings can be customized, and the rotational speeds of the first spiral rod and the second spiral rod can be adjusted, the dosing set is suitable for sampling large and small doses of reagent, and in particular for sampling doses of 0.1 mg to 100 mg or even of 2 mg and below, which can be sampled automatically with a high degree of sampling accuracy.

For example, an outlet valve adapted to open and close the second channel second opening may also be provided to effectively prevent leakage of the reagent in the dosing apparatus in an unused state and the entry of moisture from the outside, in particular, leakage of the reagent in the event of air movement, vibration, shaking, or static electricity.

As another example, the dosing apparatus provided in the embodiment of the present invention has a compact structure and occupies less space, which is conducive to saving space and cost.

Figure 1:
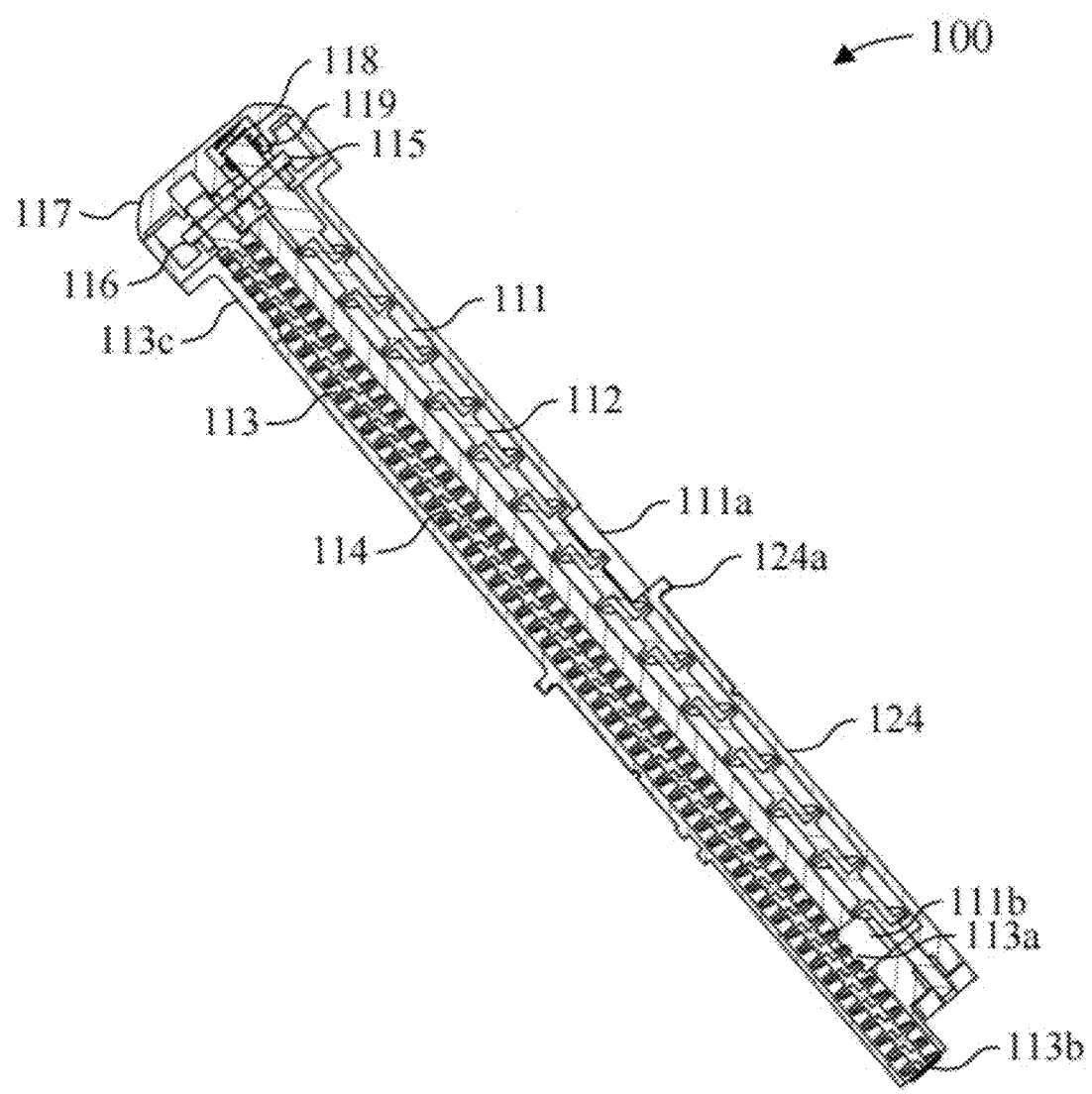
FIG. 1 is a cross-sectional view of the dosing apparatus in an embodiment of the present disclosure.

REFERENCE NUMERALS 100 dosing apparatus, 111 first channel, 111a first channel first opening, 111b first channel second opening, 112 first spiral rod, 113 second channel, 113a second channel first opening, 113b second channel second opening, 113c second channel third opening, 114 second spiral rod, 115 end-face cam, 115a first beveled surface, A the high point of the first beveled surface, B the low point of the first beveled surface, 115b first vertical surface, 116 first gear, 117 top cover, 118 elastic member, 119 cam fitting member, 119a second beveled surface, C the high point of second beveled surface, D the low point of second beveled surface, 119b second vertical surface, 119c guiding block, 119d support edge, 120 outlet valve, 121 closure portion, 122 hook portion, 122a hook slot, 123 hook block, 124 channel housing, 124a restriction block, 125 trigger section, 126 third channel, 126a third channel first opening, 127 conveyor belt, 127a first conveyor segment, 127b second conveyor segment, 127c groove, 200 dosing set, 211 container, 211a sidewall of container opening, 220 connector structure, 221 connector, 222 support member, 223 bearing member, 224 first sealing ring, 225 second sealing ring, 300 dosing head, 310 driving apparatus, 311 drive motor, 312 second gear, 313 third gear, 314 fourth gear, 315 drive housing, 316 sensing structure, 317 outlet valve motor, 318 connecting rod, 320 locking structure, 321 toggle member, 322 cam, 322a camshaft, 323 abutment member, 323a extension portion, 323b opening end, 323c closing end, 324a first spring, 324b second spring, 400 dosing equipment, 410 lifting and turning structure, 500 dosing system, 510 balance, and 520 controller.

DETAILED DESCRIPTION OF THE INVENTION

In order that the objects, features and beneficial effects of the present disclosure can be more obvious and understandable, specific embodiments of the present disclosure are described in detail below in conjunction with the accompanying drawings. It is to be understood that the specific embodiments described hereinafter are only for explaining the present disclosure, and are not intended to be a limitation of the present disclosure. Moreover, descriptions of the same and similar components in different embodiments and descriptions of components, features, effects, etc., which are part of the prior art may be omitted.

Moreover, for the convenience of description, only part but not all of the structure related to the present disclosure may be shown in the accompanying drawings. Moreover, the same and similar attachment marks may be used in the accompanying drawings to refer to the same and similar parts in different embodiments.

Referring to FIGS. 1 through 20, embodiments of the present disclosure provide a dosing apparatus 100, a dosing set 200, a dosing head 300, a dosing equipment 400, and a dosing system 500.

A first aspect of embodiments of the present disclosure is that a dosing apparatus 100 is provided.

Specifically, the dosing apparatus 100 includes a conveying channel 111/126 and a conveying mechanism. Wherein, the conveying channel 111/126 has a conveying channel first opening 111a/126a connecting with a container 211 on the outside to allow a reagent within the container 211 to enter the conveying channel 111/126, and a conveying channel second opening 111b connecting with the outside of the conveying channel 111/126 to allow the reagent to leave the conveying channel 111/126. The conveying mechanism is provided within the conveying channel 111/126 and is adapted to be driven to move to convey the reagent within the conveying channel 111/126 to the conveying channel second opening 111b, as well as to control a mass flow rate of the reagent exiting the conveying channel through the conveying channel second opening 111b by adjusting a speed of its own movement.

Figure 2:
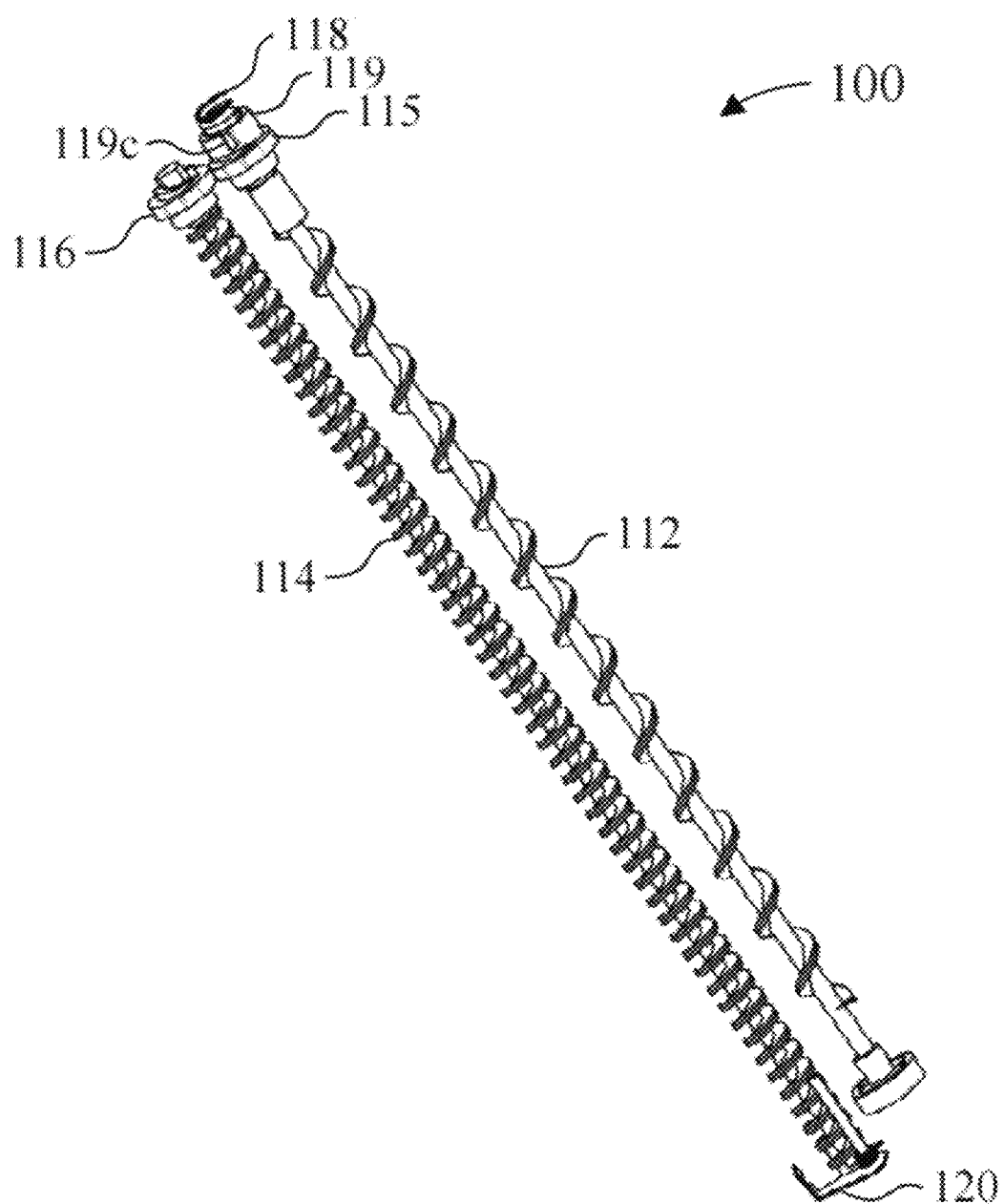
FIG. 2 is a partial schematic diagram of the dosing apparatus in an embodiment of the present disclosure.
Figure 3:
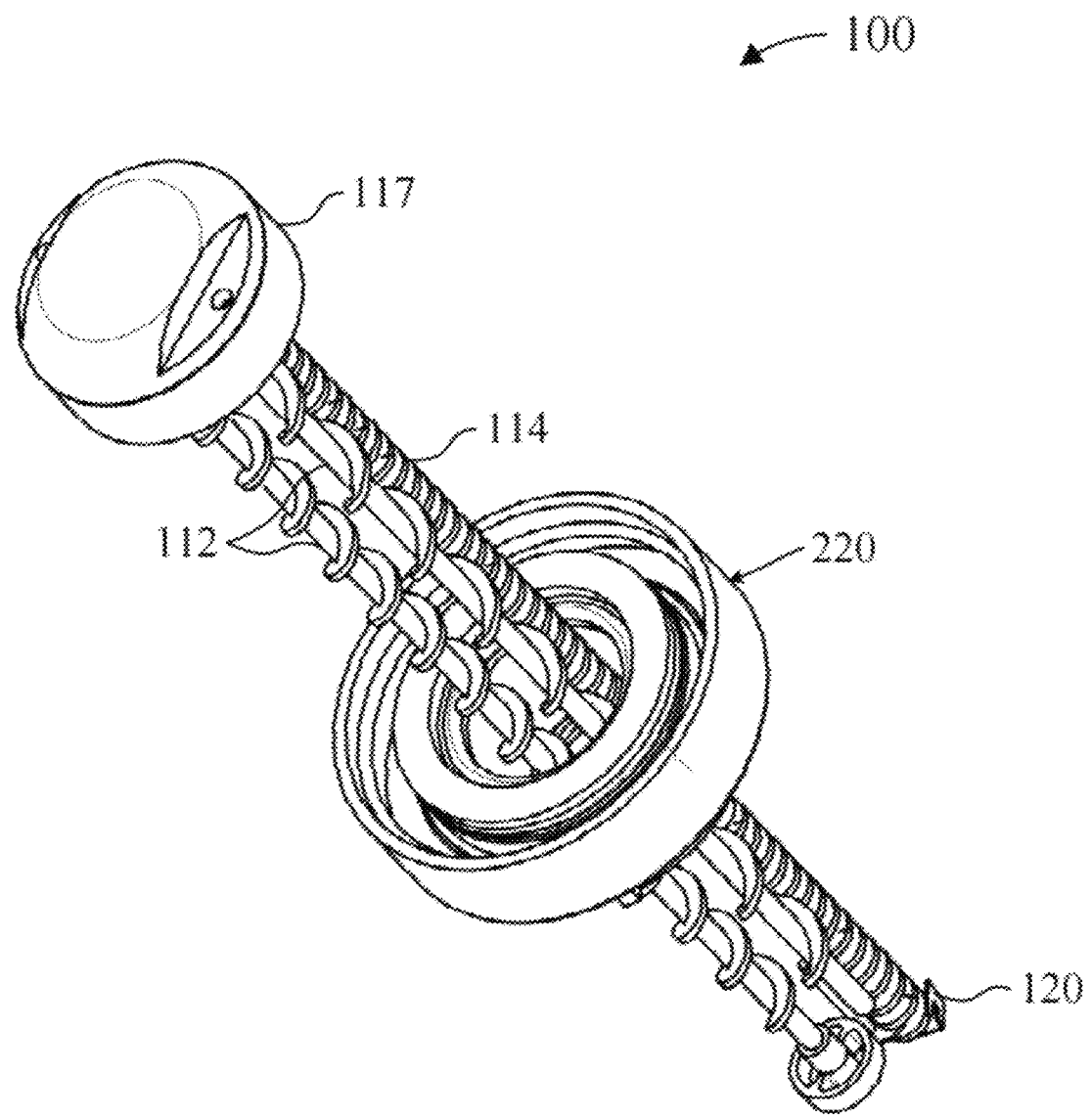
FIG. 3 is another partial schematic diagram of the dosing apparatus in an embodiment of the present disclosure.
Figure 4:
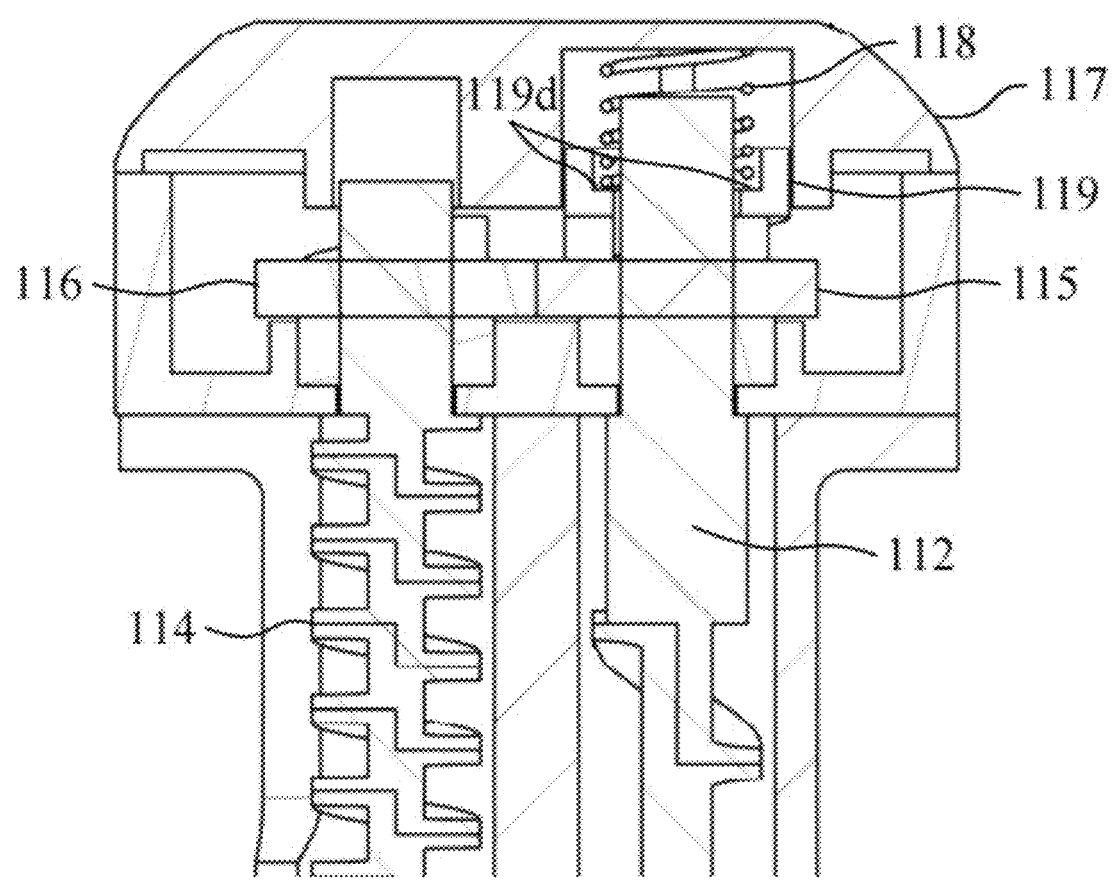
FIG. 4 is a partial cross-sectional view of the dosing apparatus in an embodiment of the present disclosure.

Referring to FIGS. 1 to 3, in some embodiments, the conveying channel 111/126 may include a first channel 111, the conveying channel first opening 111a/126a may include a first channel first opening 111a, and the conveying channel second opening 111b may include a first channel second opening 111b. Accordingly, the conveying mechanism includes at least one first spiral rod 112 disposed within the first channel 111.

In particular embodiments, each of the at least one first spiral rod 112 is adapted to be driven to rotate in the first direction to convey the reagent within the first channel 111 to the first channel second opening 111b, as well as to control a mass flow rate of the reagent leaving through the first channel second opening 111b by adjusting a rotational speed of itself.

It will be appreciated that by adjusting the rotational speed of the first spiral rod 112, it is possible to control the mass of the reagent conveyed by the first spiral rod 112 per unit of time, and thereby control the mass flow rate of the reagent leaving the first channel 111. The mass flow rate of the reagent leaving the first channel 111 is the mass of the reagent leaving through the first channel second opening 111b in a unit of time. And, when the mass flow rate of the output reagent is determined, the mass of the output reagent is obtained based on the time that the reagent is output.

With the above technical solution, on the one hand, the mass flow rate of the sampled reagent can be controlled by adjusting the rotational speed of the first spiral rod 112 so as to accurately weigh and sample the reagent, especially the powder reagent; on the other hand, the automation of the reagent sampling is realized so as to avoid the weighing error and reagent contamination caused by manual weighing and sampling.

In some embodiments, the relationship between the mass flow rate of various reagent and the rotational speed of the first spiral rod 112 can be obtained experimentally. That is, the mass flow rate of the various reagent can be measured separately at different rotational speeds of the first spiral rod 112, so as to obtain the relationship between the mass flow rate of the various reagent and the rotational speed of the first spiral rod 112. The specific experimental process can be realized by any conventional technical means known in the art, and will not be repeated herein.

In some embodiments, the dosing apparatus 100 may further include a second channel 113 and at least one second spiral rod 114 disposed within the second channel 113.

Specifically, the second channel 113 has a second channel first opening 113a in connection with the first channel second opening 111b to allow the reagent within the first channel 111 to enter the second channel 113, a second channel second opening 113b in connection with the outside to allow the reagent to exit the second channel 113, and a second channel third opening 113c in connection with the container 211 to allow the reagent to exit the second channel 113 and return to the container 211.

In particular embodiments, the second spiral rod 114 is in meshing transmission connection with the first spiral rod 112 to rotate in a second direction driven by the first spiral rod 112, to convey the reagent within the second channel 113 to the second channel second opening 113b and the second channel third opening 113c. The second direction is opposite to the first direction.

It is to be understood that by adjusting the rotational speed of the first spiral rod 112, the mass of the reagent conveyed by the first spiral rod 112 per unit of time can be controlled, thereby controlling the mass flow rate at which the reagent leaves the first channel 111 and enters the second channel 113, and thereby controlling the mass flow rate at which the reagent leaves the second channel 113. The mass flow rate of the reagent leaving the second channel 113 is the mass of the reagent leaving through the second channel second opening 113b in a unit of time.

With the above technical solution, the excess reagent in the first channel 111 can be made to enter the second channel 113 and be sent back to the container 211 through the second spiral rod 114 in the second channel 113, thereby avoiding the accumulation and clumping of the reagent in the first channel 111, as well as the possible influence on the rotation and rotational speed of the first spiral rod 112 that may be brought about by the accumulation and clumping of the reagent, and thus enabling the reagent to be smoothly output.

In some embodiments, the first channel first opening 111a can be provided in the mid-side portion of the first channel 111 and connected to the container 211; the first channel second opening 111b can be provided in the lower side portion of the first channel 111; the second channel first opening 113a may be provided at a lower side portion of the second channel 113 and is in connection with the first channel second opening 111b; the second channel second opening 113b may be provided at a bottom end of the second channel 113 and is in connection with the exterior of the dosing apparatus 100; and the second channel third opening 113c may be provided at an upper side portion of the second channel 113 and is in connection with the container 211.

In this way, excess reagent can be caused to return to the container 211 to avoid reagent backlog within the dosing apparatus 100, thereby facilitating reagent flow, and thereby facilitating reagent output through the dosing apparatus 100.

In a specific implementation, the pitch, diameter and rotational speed of the first spiral rod 112 and the second spiral rod 114 can be customized based on the specifics of the reagent. Wherein, the specifics of the reagent may include the type of reagent, the particle size of the reagent, and the delivery dose of the reagent.

In some embodiments, the pitch difference, the diameter difference, and the rotational speed difference between the first spiral rod 112 and the second spiral rod 114 are all greater than zero. In this way, it can be beneficial for the reagent to be output outwardly through this dosing apparatus 100.

In some embodiments, this dosing apparatus 100 may include a first spiral rod 112 and a second spiral rod 114. Wherein, this first spiral rod 112 and this second spiral rod 114 are in meshing transmission connection. Specific examples may be shown with reference to FIGS. 1 and 2.

In other embodiments, the dosing apparatus 100 may include at least two first spiral rods 112 and one second spiral rod 114. Wherein the second spiral rod 114 is in meshing transmission connection with one of the at least two first spiral rods 112. Specific examples may be shown with reference to FIG. 3, in which the dosing apparatus 100 includes two first spiral rods 112 and a second spiral rod 114.

In yet further embodiments, the dosing apparatus 100 may include one first spiral rod 112 and at least two second spiral rods 114. Wherein the first spiral rod 112 is in meshing transmission connection with one of the at least two second spiral rods 114. And the at least two second spiral rods 114 are synchronously rotationally connected such that the second spiral rod 114 that is in meshing transmission connection with the first spiral rod 112 drives the other second spiral rods 114 to synchronously rotate.

In yet further embodiments, the dosing apparatus 100 may include at least two first spiral rods 112 and at least two second spiral rods 114. Wherein, one of the at least two second spiral rods 114 is in meshing transmission connection with one of the at least two first spiral rods 112, and the at least two second spiral rods 114 are synchronously rotationally connected such that the second spiral rod 114 that is in meshing transmission connection with the first spiral rod 112 drives the other second spiral rods 114 to synchronously rotate.

In specific implementations, the synchronously rotating individual second spiral rods 114 may be connected in any manner known in the art, without limitation herein. For example, the synchronized rotation of the individual second spiral rods 114 may be realized using planetary gears.

In some embodiments, the dosing apparatus 100 may include at least two first spiral rods 112 that are synchronously rotationally connected to each other.

In specific embodiments, the synchronously rotating individual first spiral rods 112 may also be connected in any manner known in the art, without limitation herein. For example, the synchronously rotating individual first spiral rods 112 may also be connected using planetary gears.

As previously described, the second spiral rod 114 is in meshing transmission connection with the first spiral rod 112 and is adapted to rotate in a second direction driven by the first spiral rod 112. Wherein the second direction is opposite to the rotation direction of the first spiral rod 112, i.e., the first direction.

Referring to FIGS. 1 to 3, in some embodiments, the first spiral rod 112 and the second spiral rod 114 in the meshing transmission connection may be disposed parallel to each other, the tip of the first spiral rod 112 extends outside of the first channel 111, and the tip of the second spiral rod 114 extends outside of the second channel 113.

Accordingly, the dosing apparatus 100 includes an end-face cam 115 rotationally connected coaxially with the tip of the first spiral rod 112, and a first gear 116 rotationally connected coaxially with the tip of the second spiral rod 114.

In particular embodiments, the end-face cam 115 is in meshing transmission connection with the first gear 116. The first spiral rod 112 is adapted to be driven by a driving apparatus 310 external to the dosing apparatus 100 via its bottom end to rotate in a first direction while driving the end-face cam 115 to rotate in a first direction, thereby driving the first gear 116 to rotate in a second direction, thereby driving the second spiral rod 114 to rotate in a second direction.

In some embodiments, the first direction may be a counterclockwise direction or a clockwise direction. Accordingly, the second direction may be a clockwise direction or a counterclockwise direction.

With the above technical solution, by setting the first spiral rod 112 and the second spiral rod 114 as parallel to each other and engaging in a drive connection, so that the first spiral rod 112 can drive the second spiral rod 114 to rotate in the second direction when it rotates in the first direction, it not only realizes the synchronization of the sample-giving (i.e., the output of the reagent) and sample-returning (i.e., the reagent being returned to the container 211), but also eliminates the need for an additional drive source for the second spiral rod 114, saving space and cost of the product.

It will be appreciated that "sample-giving" refers to outputting the reagent in the container 211 outside of the container 211 via the dosing apparatus 100, and "sample-returning" refers to sending the reagent in the first channel 111 back into the container 211 via the second spiral rod 114.

In some embodiments, the dosing apparatus 100 provided by embodiments of the present disclosure may further include a rotation limiting structure to limit the first spiral rod 112 and the second spiral rod 114 from rotating in the opposite direction.

Referring to FIGS. 1 to 4, in some embodiments, the dosing apparatus 100 further includes a top cover 117 disposed above the first channel 111 and the second channel 113, and an elastic member 118 and a cam fitting member 119 disposed sequentially between the top cover 117 and the end-face cam 115. Wherein, the elastic member 118 and the cam fitting member 119 are adapted to move only in the direction of the axis of the first spiral rod 112.

Specifically, the cam fitting member 119 is adapted to reciprocate along the axial direction of the first spiral rod 112 driven by the end-face cam 115 when the end-face cam 115 is rotating in the first direction, and to limit the rotation of the end-face cam 115 in the second direction when the end-face cam 115 is to rotate in the second direction. The elastic member 118 is adapted to compress as well as release compression under the action of the cam fitting member 119 during rotation of the end-face cam 115 in the first direction.

In some embodiments, the cam fitting member 119 further includes a guiding block 119c provided at a side portion thereof. Accordingly, the side portion of the top cover 117 has a guide slot extending in the direction of the axis of the first spiral rod 112. The guide slot is adapted to receive the guiding block 119c and allow the guiding block 119c to reciprocate therein in the axial direction of the first spiral rod 112.

In some embodiments, the elastic member 118 may include a spring. Accordingly, the tip of the first spiral rod 112 passes through the end-face cam 115 and the cam fitting member 119 in turn and extends above the cam fitting member 119. Moreover, the cam fitting member 119 has a support edge 119d provided on its inner ring to support the spring.

In particular embodiments, the spring is sleeved on the outside of the first spiral rod 112 and its ends resist the inner end surface of the top cover 117 and the support edge 119d, respectively. In this way, the spring can be adapted to be compressed upwardly when the cam fitting member 119 is moved upwardly in the axial direction of the first spiral rod 112, and to be released from compression downwardly when the cam fitting member 119 moves to the uppermost position, allowing the cam fitting member 119 to move downwardly in the axial direction of the first spiral rod 112, thereby enabling the cam fitting member 119 to reciprocate in the axial direction of the first spiral rod 112.

Figure 5:
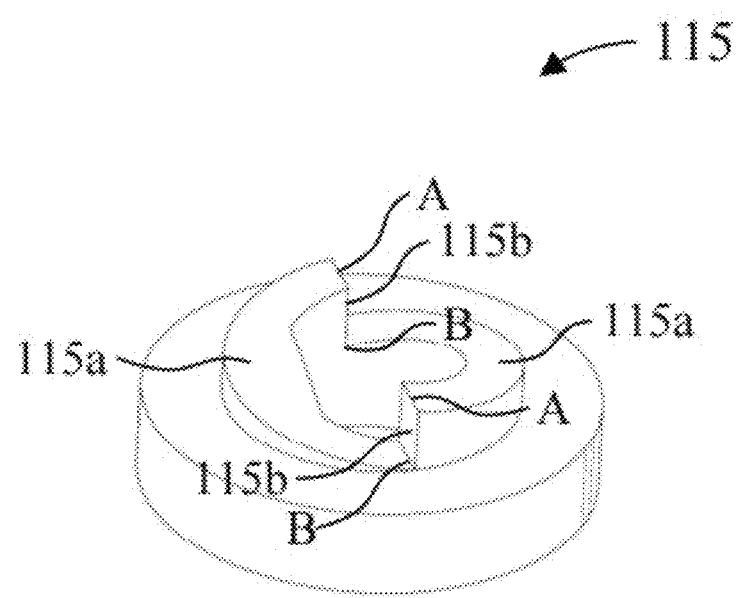
FIG. 5 is a schematic view of the end-face cam in an embodiment of the present disclosure.
Figure 6:
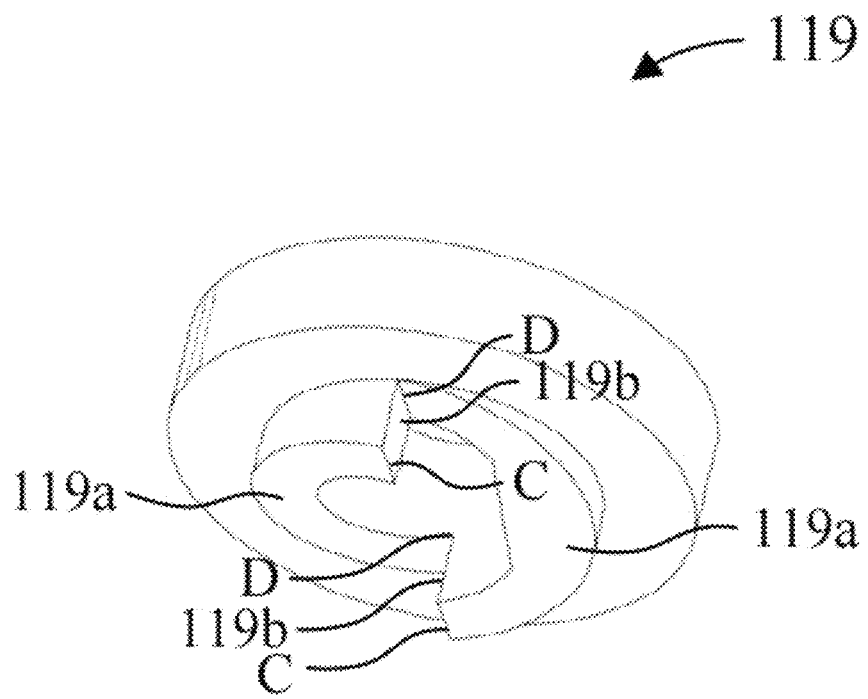
FIG. 6 is a schematic view of the cam fitting member in an embodiment of the present disclosure.
Figure 7:
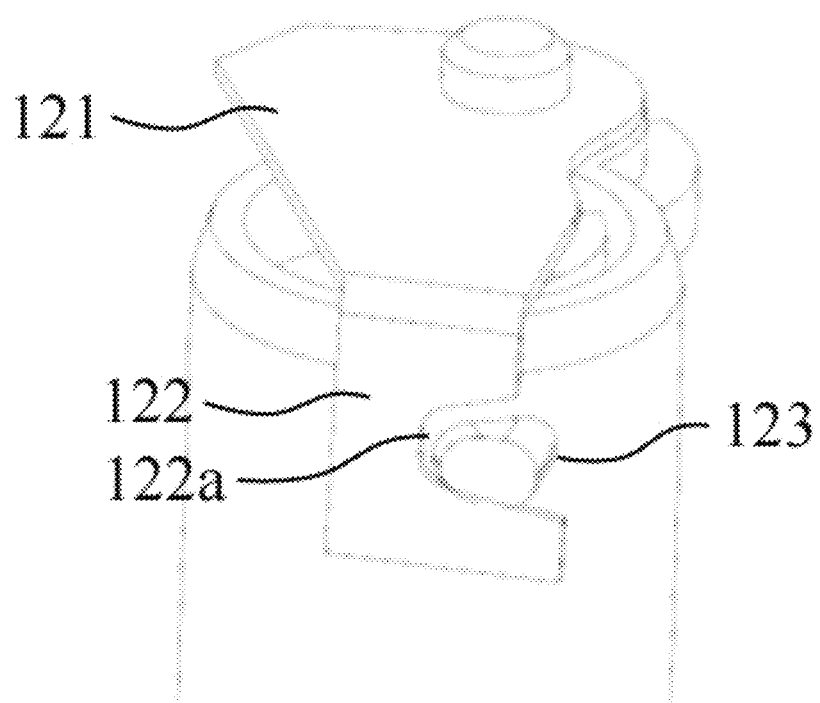
FIG. 7 is a schematic diagram of the outlet valve in an embodiment of the present disclosure, wherein the outlet valve is in a closed state.
Figure 8:
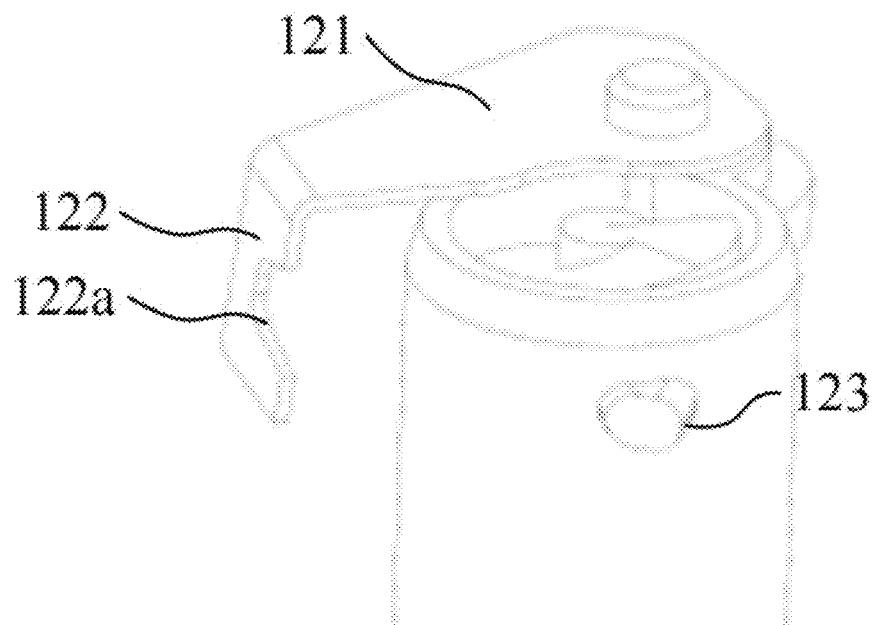
FIG. 8 is another schematic diagram of the outlet valve in an embodiment of the present disclosure, wherein the outlet valve is in an open state.

Referring to FIGS. 5 and 6, in some embodiments, the end-face cam 115 has a pair of first beveled surfaces 115a and a pair of first vertical surfaces 115b at one end thereof facing the cam fitting member 119. Correspondingly, the cam fitting member 119 has a pair of second beveled surfaces 119a and a pair of second vertical surfaces 119b at its end facing the end-face cam 115. Wherein, the two first beveled surfaces 115a each covers a half turn of the end-face cam 115; and the two second beveled surfaces 119a each covers a half turn of the cam fitting member 119.

In some embodiments, a high point A of one of the pair of first beveled surfaces 115a is adjacent to a low point B of the other first beveled surface 115a and they are connected by one of the first vertical surfaces 115b, while a low point B of one of the first beveled surfaces 115a is adjacent to a high point A of the other first beveled surface 115a and they are connected by the other first vertical surface 115b.

Accordingly, a high point C of one of the pair of second beveled surfaces 119a is adjacent to a low point D of the other second beveled surface 119a and they are connected by one of the second vertical surfaces 119b, while a low point D of one second beveled surface 119a is adjacent to a high point C of the other second beveled surface 119a and they are connected by another second vertical surface 119b.

In the initial state, the first beveled surfaces 115a are opposite to and mated with the second beveled surfaces 119a, and the first vertical surfaces 115b are opposite to and mated with the second vertical surfaces 119b. Moreover, when the first beveled surfaces 115a are mated with the second beveled surfaces 119a, the high point A of each first beveled surface 115a meets the low point D of the corresponding second beveled surface 119a, and the low point B of each first beveled surface 115a meets the high point C of the corresponding second beveled surface 119a.

When the end-face cam 115 is rotated in the first direction, each first vertical surface 115b will move away from the corresponding second vertical surface 119b with which it is mated, and each first beveled surface 115a may rotate relative to the corresponding second beveled surface 119a with which it is mated, and push the cam fitting member 119 to reciprocate along the direction of the axis of the first spiral rod 112. At the same time, the elastic member 118 compresses as well as releases compression under the action of the cam fitting member 119.

In a specific implementation, when the end-face cam 115 rotates half a turn in the first direction, each first vertical surface 115b rotates in the direction of departing from the corresponding second vertical surface 119b, each first vertical surface 115b separates from the corresponding second vertical surface 119b, each first beveled surface 115a rotates with respect to the corresponding second beveled surface 119a, and a change from the high point A of each first beveled surface 115a meeting the low point D of the corresponding second beveled surface 119a to the high point A of each first beveled surface 115a meeting the high point C of the corresponding second beveled surface 119a occurs, thereby pushing the cam fitting member 119 upwardly in the direction of the axis of the first spiral rod 112, while the elastic member 118 is compressed upwardly by the cam fitting member 119.

In particular embodiments, when the high point A of each first beveled surface 115a meeting the low point D of the corresponding second beveled surface 119a changes to the high point A of each first beveled surface 115a meeting the high point C of the corresponding second beveled surface 119a, the cam fitting member 119 is moved from the lowermost to the uppermost.

When the end-face cam 115 continues to rotate half a turn in the first direction, each second beveled surface 119a disengages from the corresponding first beveled surface 115a, the upward force applied to the elastic member 118 is withdrawn, the elastic member 118 releases its compression downwardly and pushes the cam fitting member 119 downwardly in the direction of the axis of the first spiral rod 112 until each second beveled surface 119a once again mates with the corresponding first beveled surface 115a.

With one rotation of the end-face cam 115 in the first direction, the cam fitting member 119 completes an up and down reciprocal movement in the axial direction of the first spiral rod 112, and the elastic member 118 completes a compression and a release of that compression. When the end-face cam 115 continues to rotate in the first direction for more than one revolution, the cam fitting member 119 completes more than one reciprocal movement along the axial direction of the first spiral rod 119, and the elastic member 118 completes more than one compression and release of that compression.

Since, in the initial state, each first beveled surface 115a is mated with the corresponding second beveled surfaces 119a, the first vertical surfaces 115b each is opposite to and mated with the corresponding second vertical surface 119b, and each second vertical surface 119b can only move upward and downward along the axial direction of the first spiral rod 112 and cannot rotate in the first direction or in the second direction, in the case that the end-face cam 115 is to rotate in the second direction, each first vertical surface 115 is mated with the corresponding second vertical surface 119b, and each second vertical surface 119b blocks the corresponding first vertical surface 115b from rotating in the second direction, thereby restricting the end-face cam 115 from rotating in the second direction.

With the above technical solution, the first spiral rod 112 and the second spiral rod 114 are restricted from rotating in the opposite direction. When the first spiral rod 112 and the second spiral rod 114 are forced to rotate in the opposite direction, the first spiral rod 112 and/or the second spiral rod 114 will be damaged due to the restriction of the cam fitting member 119, which in turn will cause the dosing apparatus 100 to be destroyed. In this way, it makes the dosing apparatus 100 not reusable, thereby making a dosing apparatus 100 usable only as a one-time dedicated delivery device for one kind of reagent, thereby avoiding the dosing apparatus 100 from being reused, and thereby preventing problems such as cross contamination of the reagent or reagent misuse due to reuse.

It is understood that when the dosing apparatus 100 does not include a rotation limiting structure, the dosing apparatus 100 is reusable.

Referring to FIGS. 2, 3, and 7 to 10, the dosing apparatus 100 further includes an outlet valve 120 adapted to close as well as open the second channel second opening 113b, to effectively prevent leakage of the reagent in the dosing apparatus 100.

Specifically, the outlet valve 120 is rotationally connected to the end of the second channel 113 proximate to the second channel second opening 113b, and is adapted to be driven to rotate in a third direction to close the second channel second opening 113b, and to rotate in a fourth direction to open the second channel second opening 113b. Wherein, the fourth direction is opposite to the third direction.

In some embodiments, the third direction may be a counterclockwise direction or a clockwise direction. Accordingly, the fourth direction may be a clockwise direction or a counterclockwise direction.

In some embodiments, the outlet valve 120 includes a closure portion 121. The closure portion 121 includes a sealing member adapted to be disposed facing the second channel second opening 113b. The sealing member is adapted to move closer to and face the second channel second opening 113b as the outlet valve 120 rotates in the third direction, so as to be suitable for closing the second channel second opening 113b by embedding in the second channel second opening 113b. The sealing member is also adapted to open the second channel second opening 113b by disengaging from and moving away from the second channel second opening 113b as the outlet valve 120 is rotated in the fourth direction.

In some embodiments, the sealing member may be a silicone cap that fits over the second channel second opening 113b and is adapted to be embedded in the second channel second opening 113b, to close the second channel second opening 113b.

In some embodiments, the dosing apparatus 100 further includes a hook block 123 disposed on an outer side of the second channel 113. Accordingly, the outlet valve 120 further includes a hook portion 122 coupled to the closure portion 121 and bent relative to the closure portion 121 to be adapted to be disposed facing a side portion of the second channel 113.

Specifically, the hook portion 122 includes a hook slot 122a facing the hook block 123. The hook slot 122a is adapted to move toward the hook block 123 when the outlet valve 120 is rotated in a third direction, and to be limited by the hook block 123 when moving to the hook block 123 so that the sealing member is set facing the second channel second opening 113b so as to be embedded in the second channel second opening 113b, as well as to move away from the hook block 123 when the outlet valve 120 is rotated in a fourth direction.

In some embodiments, when the hook slot 122a is limited by the hook block 123, the hook slot 122a abuts against the bottom of the hook block 123. In this way, the upward movement of the outlet valve 120 can be restricted so that the sealing member is stably embedded within the second channel second opening 113b.

Figure 9:
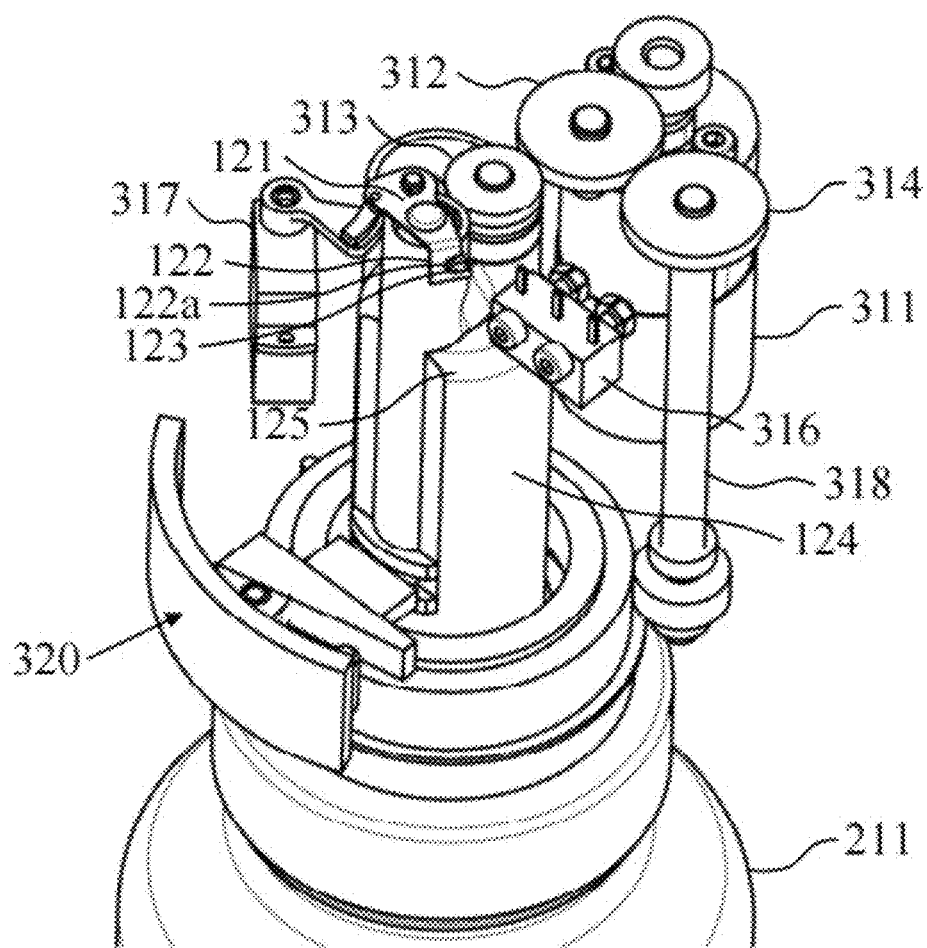
FIG. 9 is a partial schematic diagram of the dosing head in an embodiment of the present disclosure, wherein the outlet valve is in a closed state.
Figure 10:
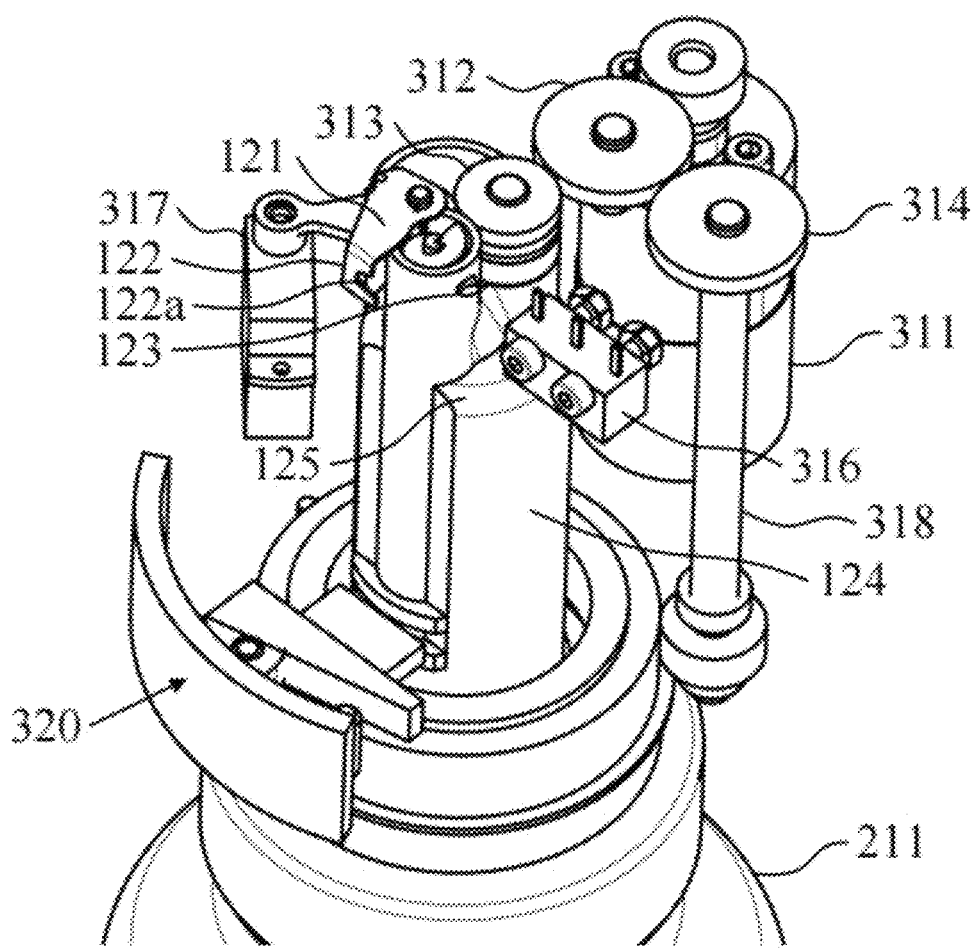
FIG. 10 is another partial schematic diagram of the dosing head in an embodiment of the present disclosure, wherein the outlet valve is in an open state.

Referring to FIGS. 9 and 10, in some embodiments, the dosing apparatus 100 further includes a channel housing 124 adapted to at least partially harbor the first channel 111 and the second channel 113. The first channel 111 and the second channel 113 are at least partially nested within the channel housing 124. Further, the channel housing 124 has a trigger section 125 at a lower side of the channel housing 124 adapted to face a sensing structure 316 outside the channel housing 124. The sensing structure 316 is coupled to the outlet valve 120 and is adapted to trigger movement of the outlet valve 120 in a third direction to close the second channel second opening 113b when it is in contact with the trigger section 125, and to trigger movement of the outlet valve 120 in a fourth direction to open the second channel second opening 113b when it is out of contact with the trigger section 125.

In some embodiments, the dosing apparatus 100 further includes an outlet valve motor 317 coupled to the outlet valve 120 and the sensing structure 316, respectively. The sensing structure 316 triggers the outlet valve motor 317 to control the movement of the outlet valve 120 in the third direction when the sensing structure 316 is in contact with the trigger section 125, and the sensing structure 316 triggers the outlet valve motor 317 to control the movement of the outlet valve 120 in the fourth direction when the sensing structure 316 is out of contact with the trigger section 125.

In some embodiments, the sensing structure 316 may employ a microswitch.

In some embodiments, the outlet valve motor 317 may employ a servo.

In some embodiments, when the dosing apparatus 100 includes both a top cover 117 and a channel housing 124, the top cover 117 may be mounted on top of the channel housing 124.

Figure 11:
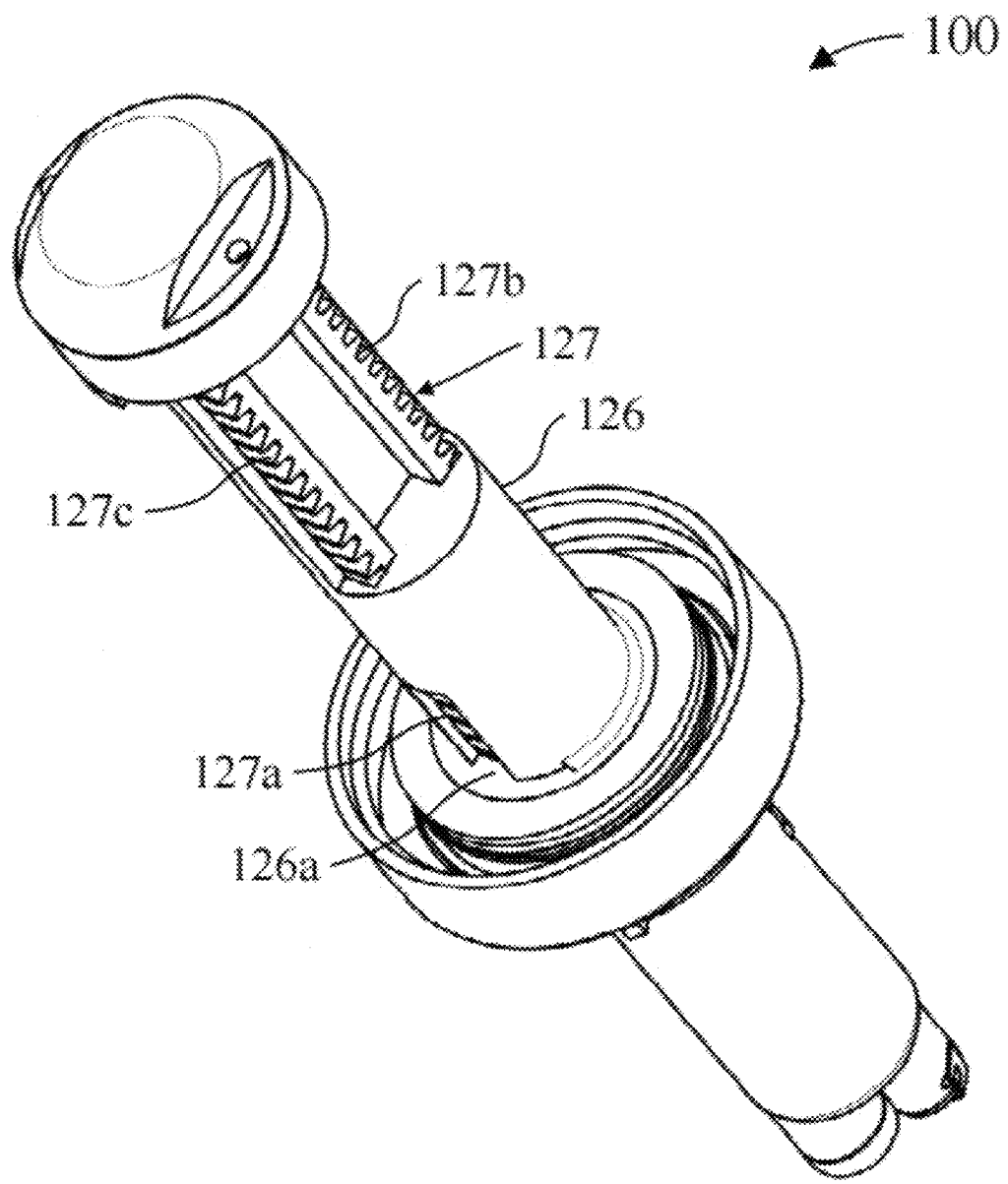
FIG. 11 is a third partial schematic view of the dosing apparatus in an embodiment of the present disclosure, wherein, for the third channel, only the lower portion thereof is shown and the upper portion thereof is not shown.

Referring to FIG. 11, in other embodiments, the conveying channel 111/126 include a third channel 126, the conveying channel first opening 111a/126a include a third channel first opening 126a, and the conveying channel second opening 111b includes a third channel second opening.

Accordingly, the conveying mechanism includes a conveyor belt 127 disposed within the third channel 126; the conveyor belt 127 is adapted to be driven to drive, and to receive a reagent from the third channel first opening 126a during the driving process and to convey the reagent to the third channel second opening to output the reagent through the third channel second opening.

In particular embodiments, the conveyor belt 127 includes a continuously varying first conveyor segment 127a and a second conveyor segment 127b. Wherein, the first conveyor segment 127a is adapted to convey the reagent to the third channel second opening; and the second conveyor segment 127b is adapted to return the reagent that does not exit through the third channel second opening back to the third channel 126.

It will be appreciated that the conveyor belt 127 is annular in shape and that any segment of the conveyor belt 127 is continuously changing in displacement during transmission, so that the position of the first conveyor segment 127a adapted to convey the reagent to the third channel second opening is continuously changing in the conveyor belt 127, and the position of the second conveyor segment 127b adapted to return the reagent that has not left through the third channel second opening is continuously changing in the conveyor belt 127.

In some embodiments, the third channel 126 includes a third channel third opening in connection with the container 211 to allow the reagent that has not left through the third channel second opening to return to the container 211.

In particular embodiments, the third channel first opening 126a may be disposed in a mid-side portion of the third channel 126 and in connection with the container 211 to receive the reagent within the container 211; the third channel second opening may be disposed in a bottom portion of the third channel and in connection with the exterior of the dosing apparatus 100 to output the reagent; and the third channel third opening may be disposed in an upper side portion of the third channel and in connection with the container 211 so that the reagent in the third channel 126 can be returned to the container 211.

In this way, it is facilitated that the reagent within the container 211 enters the third channel 126 and is transported to the outside of the container 211 and back into the container 211 again via the conveyor belt 127 disposed within the third channel 126, thereby facilitating the distribution and transport of the reagent through the dosing apparatus 100.

In some embodiments, a number of grooves 127c may also be provided on the conveyor belt 127 to facilitate reception and delivery of the reagent by the conveyor belt 127.

It should be noted that in the embodiments of the present disclosure, the volume of the conveying channel and the size of its individual openings can be customized, and the speed of movement of the conveyor mechanism within the conveying channel can be adjusted, so that the dosing apparatus 100 is suitable for sampling large or small doses of reagent.

In addition, the dosing apparatus in the current state of the art requires manual operation in small quantities for sampling doses of less than 10 mg, and the sampling results have low precision and large errors.

In contrast, by using the dosing apparatus 100 provided in the embodiment of the present disclosure, accurate sampling for the reagent with a dose of 2 milligrams and below has been tested and proven.

A second aspect of the embodiment of the present disclosure is to provide a dosing set 200.

Figure 12:
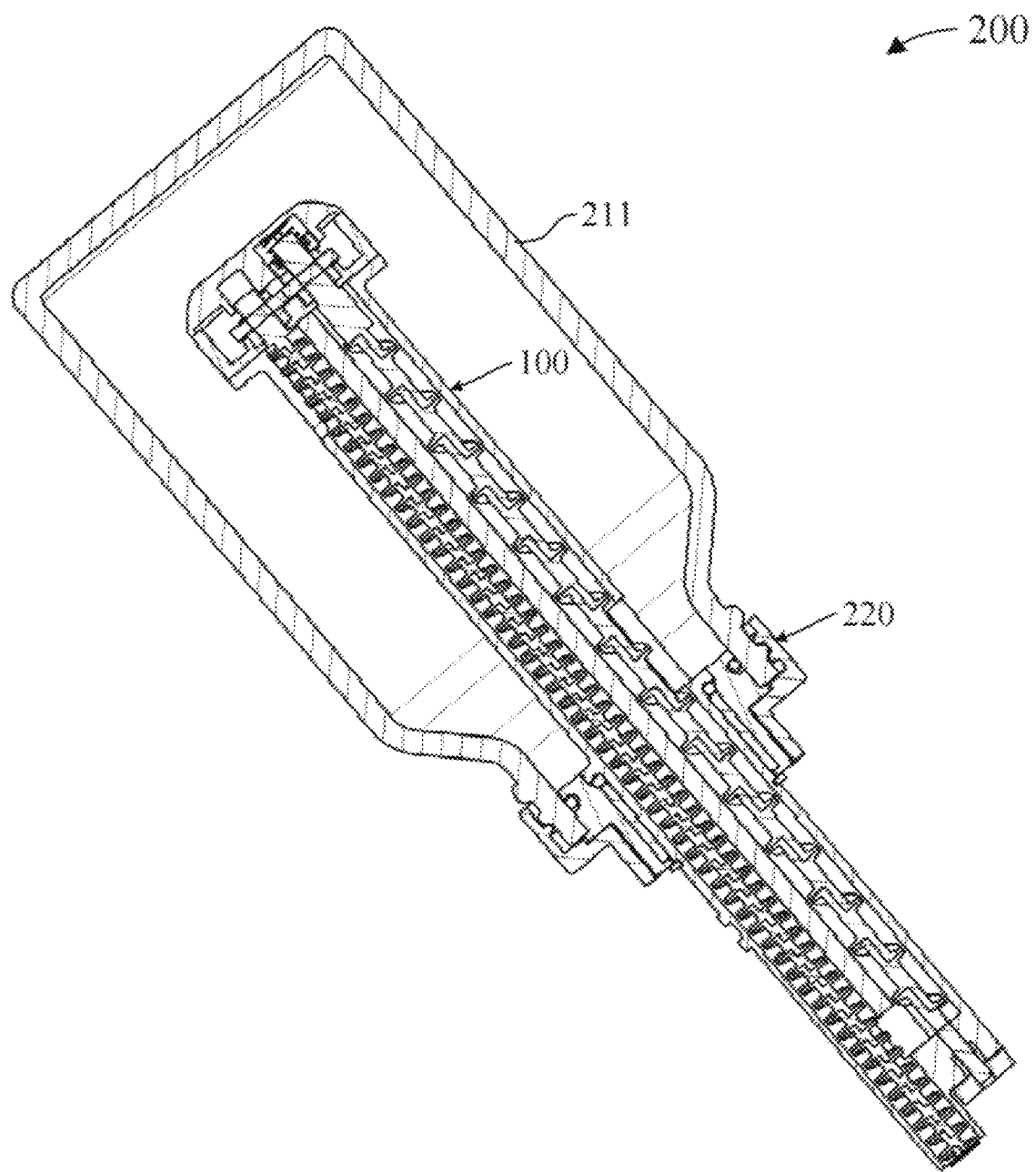
FIG. 12 is a cross-sectional view of one embodiment of the dosing set in an embodiment of the present disclosure.

Referring to FIG. 12, the dosing set 200 includes a container 211 and a dosing apparatus 100. Wherein the container 211 is adapted to hold a reagent. The dosing apparatus 100 is at least partially disposed within the container 211 and is in connection with an exterior of the container 211 to deliver the reagent within the container 211 to the exterior of the container 211.

In particular embodiments, the dosing apparatus 100 may include the dosing apparatus 100 provided in the first aspect of an embodiment of the present disclosure.

Figure 13:
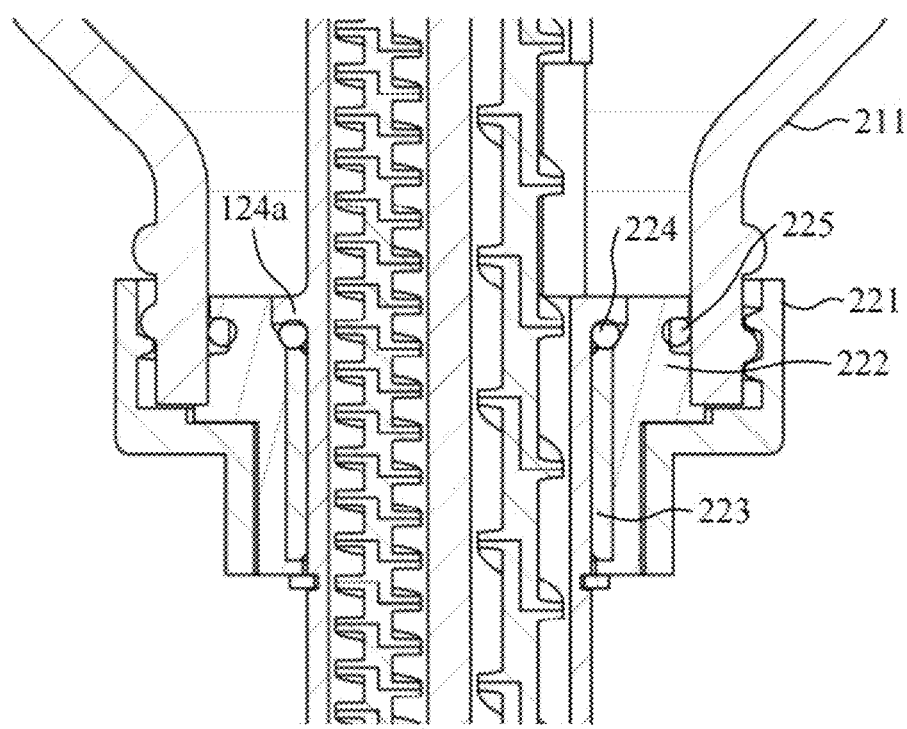
FIG. 13 is a partial cross-sectional view of the dosing set in an embodiment of the present disclosure.
Figure 14:
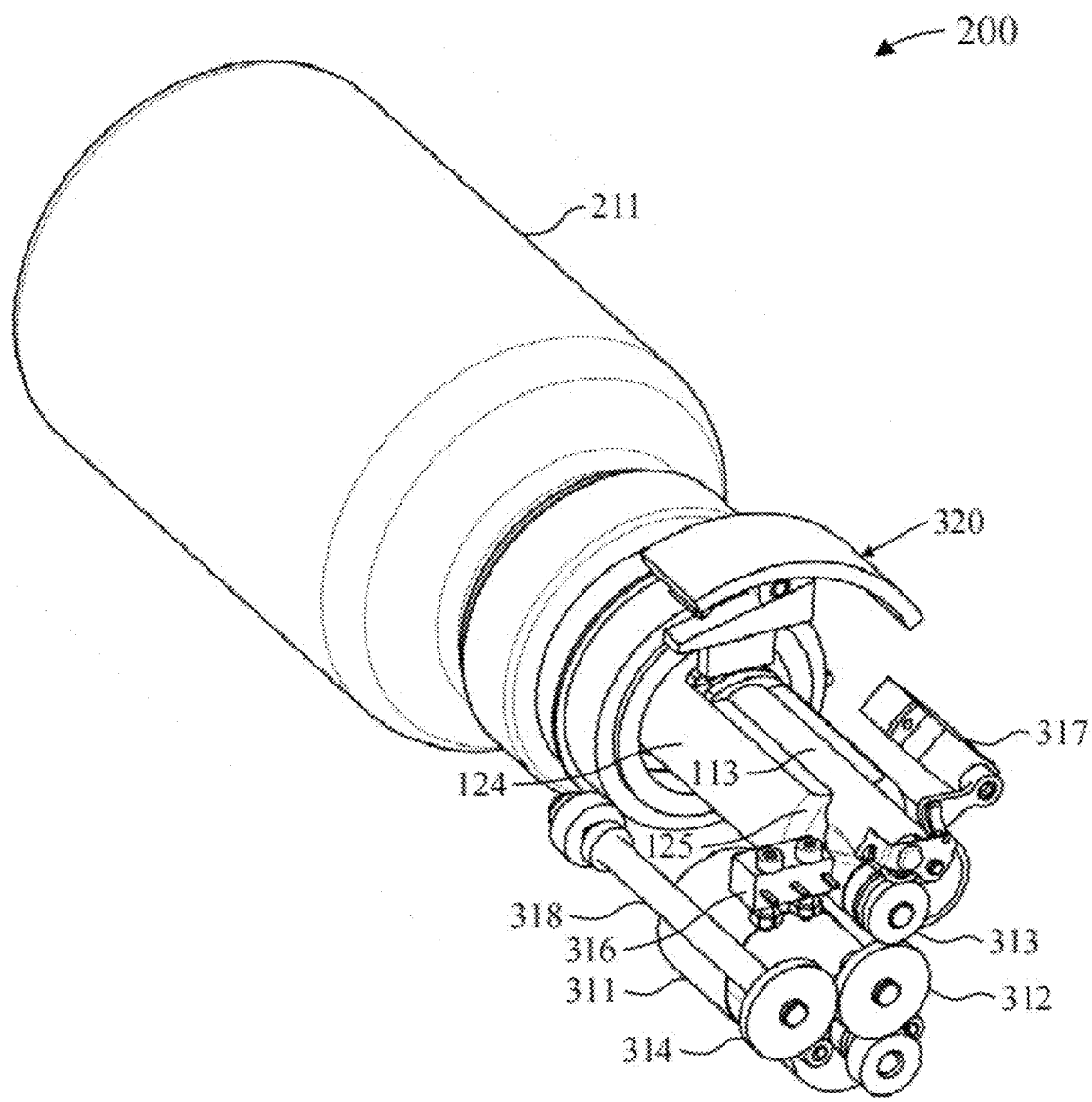
FIG. 14 is a schematic diagram of the dosing head in an embodiment of the present disclosure.
Figure 15:
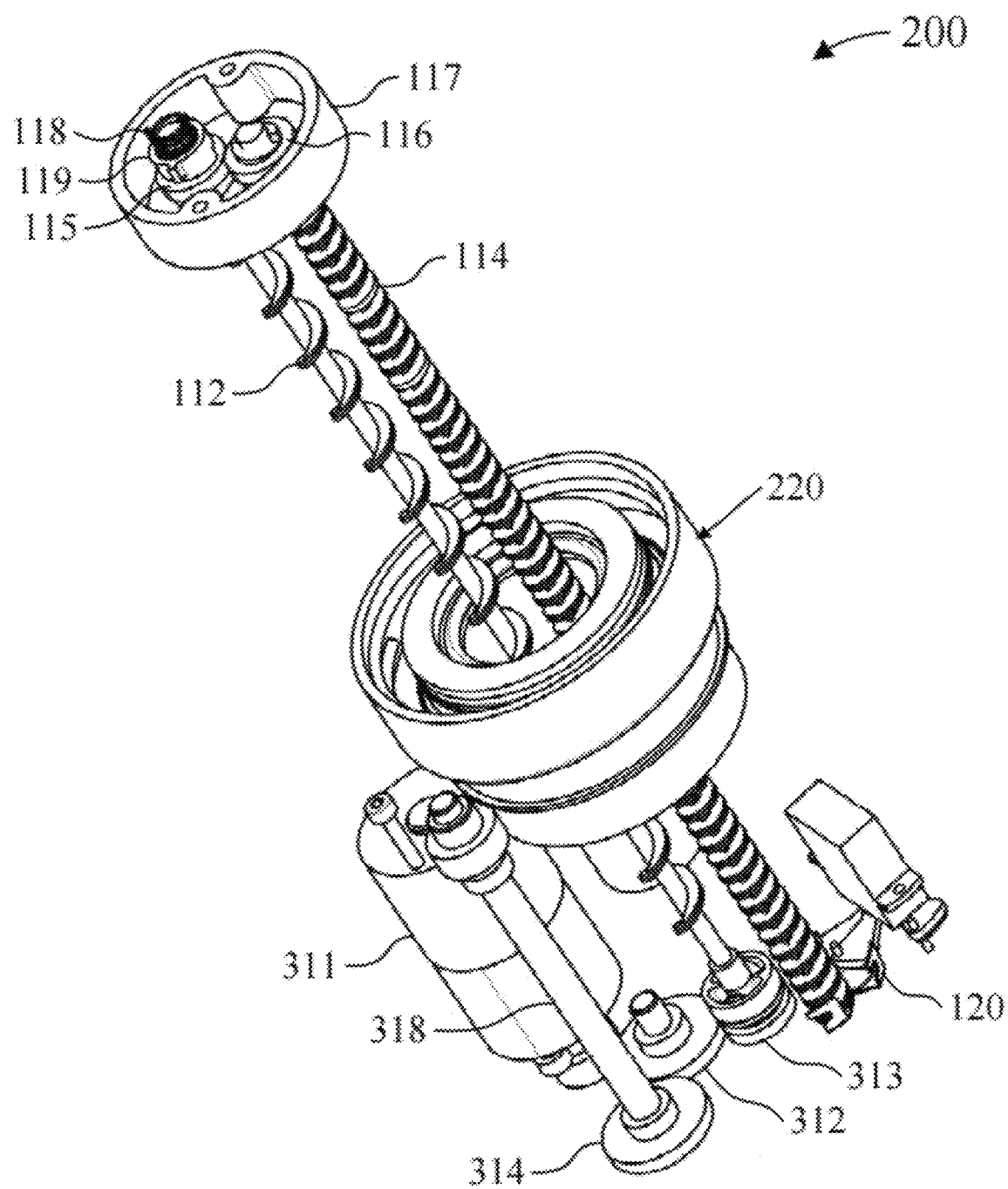
FIG. 15 is a third partial schematic view of the dosing head in an embodiment of the present disclosure.

Referring to FIGS. 12 and 13, in some embodiments, the container 211 and the dosing apparatus 100 may be connected to each other by a connector structure 220.

Specifically, the container 211 includes a container opening. The connector structure 220 includes a connector 221 penetrating along the axial direction of the container opening, and a support member 222 and a bearing member 223 that are sequentially set within the connector 221.

In particular embodiments, the dosing apparatus 100 is inserted in the bearing member 223; the connector 221 is removably socketed around an outer periphery of the container opening; and there is a gap between the connector 221 and the support member 222 to receive the sidewall 211a of the container opening.

Further, a first sealing ring 224 and a second sealing ring 225 are also provided between the support member 222 and the bearing member 223, and between the support member 222 and the sidewall 211a of the container opening, respectively, to seal-connect the connector structure 220 to the dosing apparatus 100 and the container opening, respectively.

In some embodiments, a threaded connection may be provided between the connector 221 and the outer periphery of the container opening.

In some embodiments, the dosing apparatus 100 further includes a channel housing 124 adapted to at least partially harbor the first channel 111 and the second channel 113, and the channel housing 124 is further provided with a restriction block 124a on an outer side of the channel housing 124 to define a position at which the dosing apparatus 100 is threaded in the connector structure 220, and thus a position at which the dosing apparatus 100 is coupled to the container 211.

In some embodiments, the upper end surface of the bearing member 223 may be recessed downwardly with respect to the upper end surface of the support member 222 and is adapted to receive as well as accommodate the restriction block 124a. At the same time, the first sealing ring 224 may be provided between the restriction block 124a and the upper end surface of the bearing member 223.

In this way, not only can the position of the dosing apparatus 100 threaded in the connector structure 220 can be defined to define the connection position between the dosing apparatus 100 and the container 211, but also the dosing apparatus 100 can be stably fixed to the connector structure 220, thereby providing a stable connection between the dosing apparatus 100 and the container 211.

In specific embodiments, the restriction block 124a may be provided in the middle of the channel housing 124 and located below the first channel first opening 111a so as not to interfere with the entry of the reagent in the container 211 into the first channel 111 through the first channel first opening 111a.

In some embodiments, the first spiral rod 112 is adapted to be driven to rotate in a first direction at a first speed. At the same time, the container 211 is also adapted to be driven to rotate in the first direction at a second speed. Wherein, the second speed is less than the first speed.

In this way, the reagent in the container 211 can be made to flow to prevent accumulation, thereby facilitating the reagent in the container 211 to smoothly enter the first channel 111 through the first channel first opening 111a, and thereby facilitating the reagent to be smoothly output through the dosing apparatus 100.

A third aspect of the embodiment of the present disclosure is to provide a dosing head 300.

Referring to FIGS. 14 to 18, the dosing head 300 includes a dosing set 200 and a driving apparatus 310. Wherein the dosing set 200 includes a container 211 and a dosing apparatus 100; the container 211 is adapted to hold a reagent; the dosing apparatus 100 includes a first dosing mechanism and a second dosing mechanism that are in meshing transmission connection with each other, wherein the first dosing mechanism is adapted to deliver the reagent within the container 211 to the second dosing mechanism, and the second dosing mechanism is adapted to deliver the reagent to the exterior of the container 211; and the driving apparatus 310 is connected to the first dosing mechanism and is adapted to drive the first dosing mechanism to rotate in a first direction while driving the second dosing mechanism to rotate in a second direction through the first dosing mechanism; the second direction being opposite to the first direction.

In particular embodiments, the first dosing apparatus includes at least a first channel 111 and a first spiral rod 112 provided in the first aspect of the embodiments of the present disclosure, and the second dosing apparatus includes at least a second channel 113 and a second spiral rod 114 provided in the first aspect of the embodiments of the present disclosure.

In some embodiments, the driving apparatus 310 may include a drive motor 311, a second gear 312 coaxially coupled to the drive motor 311, and a third gear 313 in meshing transmission connection with the second gear 312.

In particular embodiments, the first spiral rod 112 is coaxially connected to the third gear 313. The second gear 312 is adapted to rotate under the drive of the drive motor 311 and drive the third gear 313 to drive the first spiral rod 112 to rotate in the first direction at the first speed.

It is to be understood that the coaxial connection of the second gear 312 with the drive motor 311 indicates that the second gear 312 is synchronously rotationally connected with the drive motor 311; and the coaxial connection of the first spiral rod 112 with the third gear 313 indicates that the first spiral rod 112 is synchronously rotationally connected with the third gear 313.

As previously mentioned, in some embodiments, at least two first spiral rods 112 may be provided. In this case, the at least two first spiral rods 112 may be synchronously rotationally connected, e.g., planetary gears may be used for synchronous rotational connection, and one of the at least two first spiral rods 112 is coaxially connected to the third gear 313 to drive that first spiral rod 112 to rotate in the first direction by the drive motor 311, so as to drive the other first spiral rods by that first spiral rod 112 to rotate in the first direction.

Further, the first spiral rod 112 coaxially connected to the third gear 313 may also be in meshing transmission connection with the second spiral rod 114.

As previously mentioned, in some embodiments, at least two second spiral rods 114 may be provided. In this case, the at least two second spiral rods 114 may be synchronously rotationally connected, for example, planetary gears may be used for synchronous rotational connection, and one of the at least two second spiral rods 114 is in meshing transmission connection with a first spiral rod 112 coaxially connecting the third gear 313 to drive the second spiral rod 114 to rotate in the second direction by this first spiral rod 112, thereby driving the other second spiral rod 114 to rotate in the second direction.

As previously mentioned, in some embodiments, the first spiral rod 112 is adapted to be driven to rotate in the first direction at a first speed. The container 211 is also adapted to be driven to rotate in the first direction at the second speed. Wherein, the second speed is less than the first speed.

In this case, the driving apparatus 310 may also include a fourth gear 314 that is in meshing transmission connection with the second gear 312. And, the fourth gear 314 is coaxially connected to the container 211. Wherein, a diameter ratio of the third gear 313 to the fourth gear 314 is equal to a speed ratio of the second speed to the first speed.

In a specific implementation, the second gear 312 is adapted to rotate under the drive of the drive motor 311 and drive the third gear 313 to drive the first spiral rod 112 to rotate in the first direction at the first speed, and drive the fourth gear 314 to drive the container 211 to rotate in the first direction at the second speed.

With the above technical solution, the container 211 and the dosing apparatus 100 can be driven to rotate at the same time by the same driving apparatus 310, which not only saves the drive source, but also saves the occupying space and cost of the product.

In some embodiments, the dosing set 200 provided in the second aspect of the embodiment of the present disclosure may also include the driving apparatus 310. In this way, it is possible to drive the first spiral rod 112 to rotate in the first direction at a first speed while simultaneously driving the container 211 to rotate in the second direction at a second speed.

In some embodiments, the driving apparatus 310 may also include a drive housing 315 adapted to house the drive motor 311, the second gear 312, the third gear 313, and the fourth gear 314. And, the drive housing 315 may have an opening that mates with the connector structure 220 to connect to the connector structure 220, and to connect the container 211, the dosing apparatus 100, and the driving apparatus 310 via the connector structure 220.

In some embodiments, the opening of the drive housing 315 may have dimensions that mate with an outer periphery of the connector 211 to receive the connector 211, thereby connecting the container 211, the dosing apparatus 100, and the driving apparatus 310 via the connector structure 220.

In some embodiments, when the container 211 is simultaneously driven to rotate via the driving apparatus 310, a rotational connection is employed between the opening of the drive housing 315 and the outer periphery of the connector 211, for example, a bearing rotational connection may be employed.

In other embodiments, when the container 211 is not rotating, a fixed connection between the opening of the drive housing 315 and the outer periphery of the connector 211 may be employed, for example, a threaded connection may be employed.

In this embodiment of the present disclosure, the container 211 and the dosing apparatus 100, as well as the dosing set 200 (including the container 211 and the dosing apparatus 100) and the driving apparatus 310 can be conveniently mounted and dismounted via the connector structure 220. It not only facilitates the rapid replacement of the container 211, the dosing apparatus 100 and the dosing set 200 so that the reagent can be quickly replaced in the event that multiple reagent is to be weighed, saving time and labor, but also avoids the reagent contamination that may be brought about when multiple reagent is weighed using the same weighing apparatus for sampling, as well as the trouble of cleaning the weighing apparatus.

It can be understood that with the technical solution provided by the embodiment of the present disclosure, different kinds of reagent can be weighed and sampled using different containers 211 and the dosing apparatus 100 respectively, or the same container 211 and the dosing apparatus 100 can be used for weighing and sampling. However, when the same container 211 and the same dosing apparatus 100 are used for weighing and sampling different reagent, different reagent needs to be replaced in the container 211, and the residual reagent in the container 211 and the dosing apparatus 100 needs to be cleaned in a timely manner prior to each replacement of the reagent.

In particular embodiments, a lower portion of the dosing apparatus 100 is adapted to be inserted into the drive housing 315 to coaxially connect the first spiral rod 112 to the third gear 313, and to connect the container 211 to the fourth gear 314.

In some embodiments, the bottom end of the first spiral rod 112 has a plug. Accordingly, the third gear 313 has a socket that mates with the plug. The plug is tightly embedded into the socket to connect the first spiral rod 112 and the third gear 313.

In some embodiments, the driving apparatus 310 further includes a connecting rod 318 at least partially stowed within the drive housing 315; one end of the connecting rod 318 is coaxially coupled to the fourth gear 314, and the other end thereof is adapted to be coaxially coupled to the container 211 when the lower portion of the dosing apparatus 100 is inserted within the drive housing 315.

In some embodiments, the container 211 also has a container bore. The other end of the connecting rod 318 is adapted to be inserted and snapped into this container bore to connect the container 211 so as to drive the container 211 to rotate.

In some embodiments, the drive housing 315 further has a through-hole suitable for the connecting rod 318 to pass through. The other end of the connecting rod 318 passes through the through-hole to connect to the container bore.

In some embodiments, the dosing head 300 further includes a sensing structure 316 disposed within the drive housing 315. The dosing apparatus 100 further includes a channel housing 124 adapted to at least partially harbor the first channel 111 and the second channel 113. The first channel 111 and the second channel 113 are at least partially nested within the channel housing 124. Moreover, the lower side portion of the channel housing 124 has a trigger section 125 adapted to be disposed facing the sensing structure 316.

In particular embodiments, the trigger section 125 contacts the sensing structure 316 when the lower portion of the dosing apparatus 100 is inserted within the drive housing 315. The sensing structure 316 is coupled to the outlet valve 120 and is adapted to trigger movement of the outlet valve 120 in a third direction to close the second channel second opening 113*b* when the sensing structure 316 is in contact with the trigger section 125, and to trigger movement of the outlet valve 120 in a fourth direction to open the second channel second opening 113*b* when the sensing structure 316 is out of contact with the trigger section 125.

In some embodiments, the dosing head 300 further includes an outlet valve motor 317 coupled to the outlet valve 120 and the sensing structure 316, respectively. When the sensing mechanism 316 is in contact with the trigger section 125, the outlet valve motor 317 is triggered to control the movement of the outlet valve 120 in the third direction; when the sensing structure 316 is out of contact with the trigger section 125, the outlet valve motor 317 is triggered to control the movement of the outlet valve 120 in the fourth direction.

Figure 16:
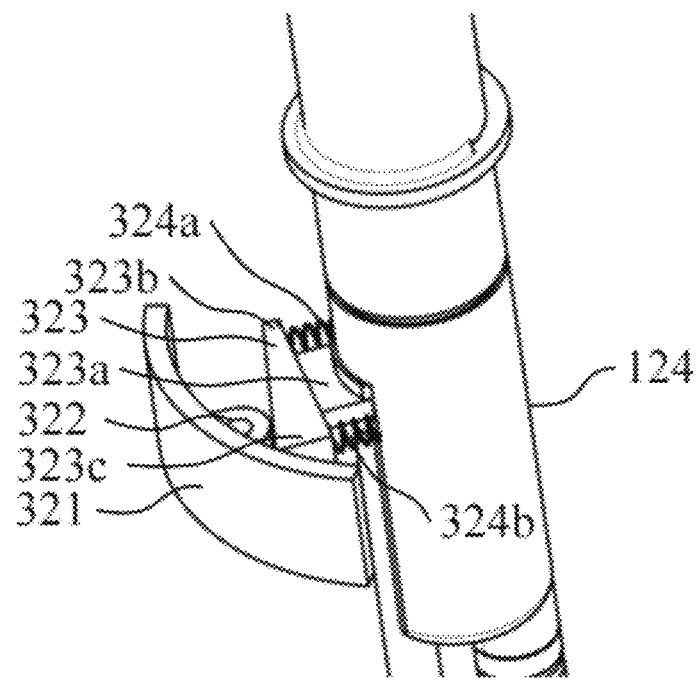
FIG. 16 is a schematic view of the locking structure in an embodiment of the present disclosure, wherein only a closed state of the locking structure is shown, and a state in which the locking structure locks the dosing apparatus is not shown.
Figure 17:
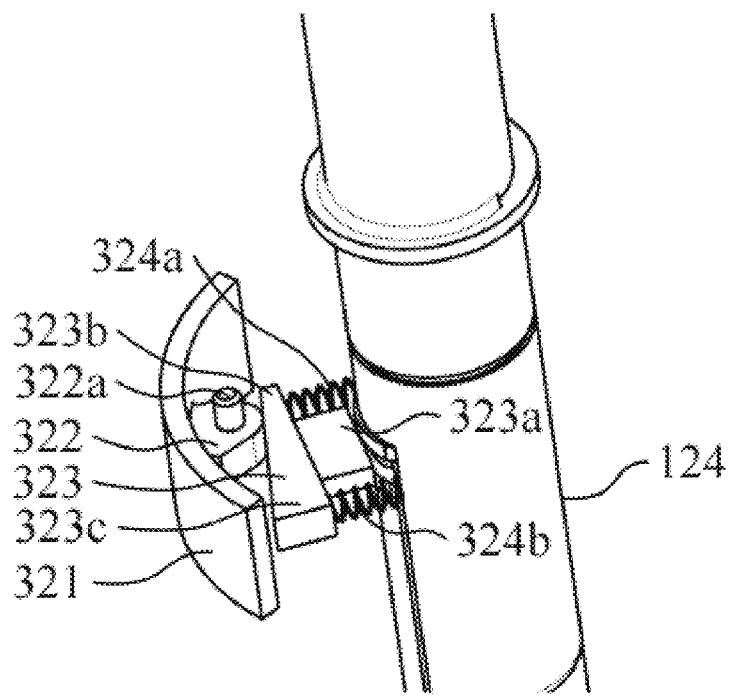
FIG. 17 is another schematic diagram of the locking structure in an embodiment of the present disclosure, wherein the locking structure is in an open state.
Figure 18:
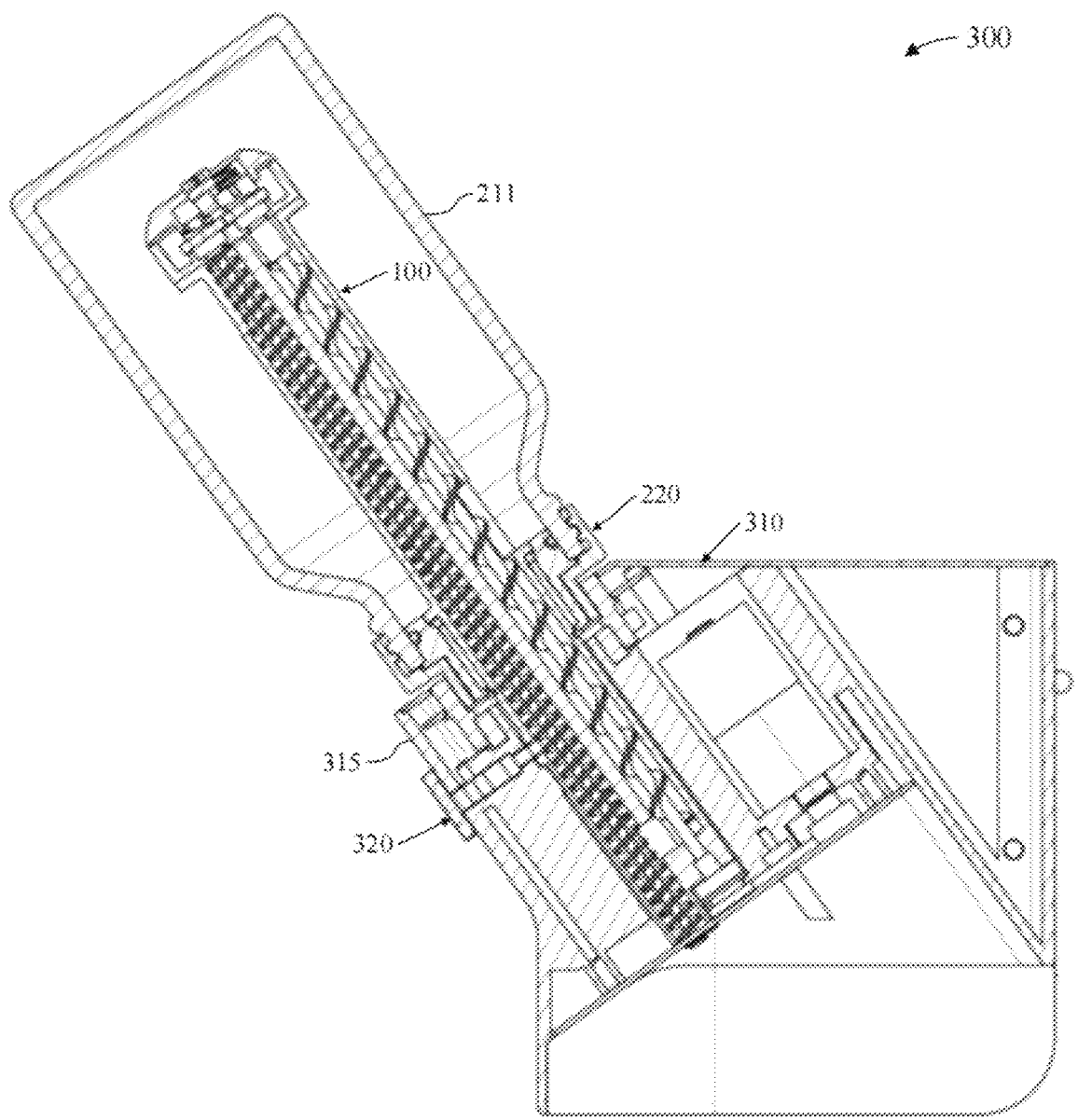
FIG. 18 is a cross-sectional view of one embodiment of the dosing head in an embodiment of the present disclosure.

Referring to FIGS. 16 and 17, the dosing head 300 further includes a locking structure 320 to lock the dosing apparatus 100 when the dosing apparatus 100 is inserted into the drive housing 315.

In some embodiments, the locking structure 320 may include a toggle member 321, a cam 322, an abutment member 323, a first spring 324*a*, and a second spring 324*b*. Among other things, the toggle member 321 is disposed on an outer side of the drive housing 315 and is coupled to the cam 322 through an inner sidewall thereof. The cam 322 is rotatably coupled to the inner side of the drive housing 315 by the camshaft 322*a*; and the portion of the cam 322 remote from the toggle member 321 is adapted to abut against the outer side of the abutment member 323 and to move along the outer side of the abutment member 323. The inner side of the abutment member 323 has an extension portion 323*a*; a first spring 324*a* and a second spring 324*b* are provided on both sides of the extension portion 323*a*, respectively.

Accordingly, the locking structure 320 further includes a receiving slot provided on the outer side of the dosing apparatus 100 and receiving holes disposed on both sides of the receiving slot, which may be, for example, a receiving slot on the outer side of the channel housing 124 and receiving holes disposed on both sides of the receiving slot.

In some embodiments, the receiving slots and receiving holes may be recessed inwardly with respect to the outer side of the dosing apparatus 100 (e.g., the outer side of the channel housing 124) to flatten the outer side of the dosing apparatus 100 (e.g., the outer side of the channel housing 124) for aesthetics.

In particular embodiments, the receiving slot is adapted to receive and accommodate the extension portion 323*a* of the abutment member 323. Two receiving holes on both sides of the receiving slot are adapted to receive a first spring 324*a* and a second spring 324*b*, respectively. Both ends of the first spring 324*a* are coupled to the inside of one end of the abutment member 323 and the inside of a first receiving hole, respectively, and both ends of the second spring 324*b* are coupled to the inside of the other end of the abutment member 323 and the inside of a second receiving hole, respectively.

In some embodiments, the two ends of the abutment member 323 may be referred to as the opening end 323*b* and the closing end 323*c*, respectively, and the width of the abutment member 323 gradually increases along the direction of the opening end 323*b* pointing toward the closing end 323*c*.

In particular embodiments, the first spring 324*a* is attached to the inner side of the opening end 323*b*, and the second spring 324*b* is attached to the inner side of the closing end 323*c*.

When the dosing apparatus 100 is inserted into the drive housing 315, the cam 322 may abut against the outer side of the opening end 323*b* of the abutment member 323. When the toggle member 321 is pivoted towards the direction of the closing end 323*c* of the abutment member 323, the cam 322 rotates about the camshaft 322*a* and moves from the outer side of the opening end 323*b* of the abutment member 323 to the outer side of the closing end 323*c* of the abutment member 323.

Since the width of the closing end 323*c* of the abutment member 323 is thicker, when the cam 322 moves to the outer side of the closing end 323*c* of the abutment member 323 and abuts against it, the cam 322 drives the extension portion 323*a* of the abutment member 323 to be embedded in the receiving slot, and at the same time, the first spring 324*a* and the second spring 324*b* are compressed, while locking the dosing apparatus 100 to prevent the dosing apparatus 100 from wobbling within the drive housing 315.

When the dosing apparatus 100 is locked, the first spring 324*a* and the second spring 324*b* are compressed to the same degree so that the elastic restoring force of the first spring 324*a* and the second spring 324*b* resisting the compression does not actuate the cam 322 to rotate, and thus the dosing apparatus 100 can be stably locked.

When the toggle member 321 is pivoted towards the direction of the opening end 323*b* of the abutment member 323, the cam 322 rotates about the camshaft 322*a* and moves from the outer side of the closing end 323*c* of the abutment member 323 to the outer side of the opening end 323*b* of the abutment member 323.

Since the width of the opening end 323*b* of the abutment member 323 is thinner, when the cam 322 moves to the outer side of the opening end 323*b* of the abutment member 323 and abuts against it, the first spring 324*a* and the second spring 324*b* extend under the action of the elastic restoring force to restore from compression, and at the same time drive the extension portion 323*a* of the abutment member 323 to leave the receiving slot to release the locking of the dosing apparatus 100, thereby facilitating smooth withdrawal of the dosing apparatus 100 from within the drive housing 315.

It should be noted that, in order to facilitate the illustration of the structure of the locking structure 320, in FIG. 16, only the state of the cam 322 being in contact with the abutment member 323 at the closing end 323*c* of the abutment member 323 is illustrated, and the actual state of the locking structure 320 when the dosing apparatus 100 is locked is not fully illustrated.

A fourth aspect of embodiments of the present disclosure is to provide a dosing equipment 400.

Figure 19:
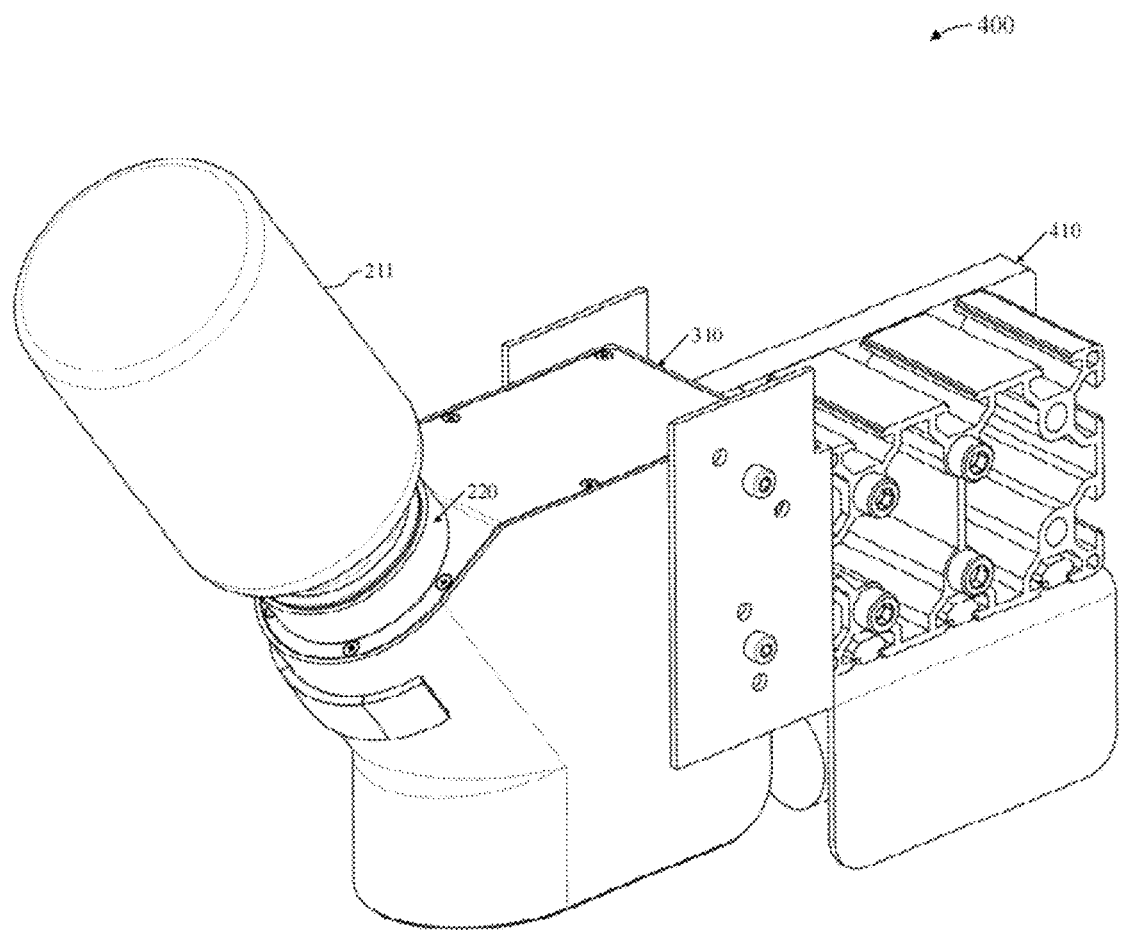
FIG. 19 shows a schematic structural diagram of a dosing equipment in an embodiment of the present disclosure.

Referring to FIG. 19, the dosing equipment 400 includes a dosing set 200 and a lifting and turning structure 410. Wherein the dosing set 200 may include a container 211 and a dosing apparatus 100; the container 211 is adapted to hold a reagent; the dosing apparatus 100 is provided at least partially within the container 211 and in connection with an exterior of the container 211 to convey the reagent within the container 211 to at least outside of the container 211; and the lifting and turning structure 410 is coupled to the dosing apparatus 100 at least in a manner to control the dosing apparatus 100's height and angle, and the dosing apparatus 100 is adapted to align the reagent bottle receiving the reagent when outputting the reagent.

It will be appreciated that when weighing and sampling the reagent, it is necessary to place the reagent bottle below the second channel second opening 113b to receive the reagent. By providing the lifting and turning structure 410 to control the height and angle of the dosing apparatus 100, the second channel second opening 113b can be smoothly aligned with the mouth of the reagent bottle for receiving the reagent.

In a specific implementation, the dosing apparatus 100 in this dosing equipment 400 may include the dosing apparatus 100 provided in the first aspect of the embodiment of the present disclosure.

In specific embodiments, the dosing set 200 in this dosing equipment 400 may include the dosing set 200 provided in the second aspect of the embodiment of the present disclosure.

In some embodiments, the dosing equipment 400 further includes a driving apparatus 310. The driving apparatus 310 is coupled to the dosing apparatus 100 to drive the dosing apparatus 100 to deliver the reagent. For example, a first spiral rod 112 in the dosing apparatus 100 may be driven by the driving apparatus 310 to rotate in a first direction and drive a second spiral rod 114 to rotate in a second direction.

In particular embodiments, the driving apparatus 310 may include the driving apparatus 310 provided in the third aspect of embodiments of the present disclosure.

In some embodiments, since the container 211, the dosing apparatus 100 may be connected to the drive housing 315 via the connector structure 220, the lifting and turning structure 410 may also be connected to the drive housing 315 and be adapted to adjust the height and angle of the drive housing 315, thereby controlling the height and angle of the dosing apparatus 100.

In the embodiment of the present disclosure, the lifting and turning structure 410 may be realized by any technical means known in the art.

For example, the lifting and turning structure 410 may be pneumatically or hydraulically controlled to control the lifting and lowering of the dosing mechanism 100 or the drive housing 315, as well as the height of the lifting and lowering.

For another example, the lifting and turning structure 410 may include a bracket, and the angle of the dosing apparatus 100 may be controlled by the mounting angle between the dosing apparatus 100 or the drive housing 315 and the bracket.

A fifth aspect of embodiments of the present disclosure is to provide a dosing system 500.

Figure 20:
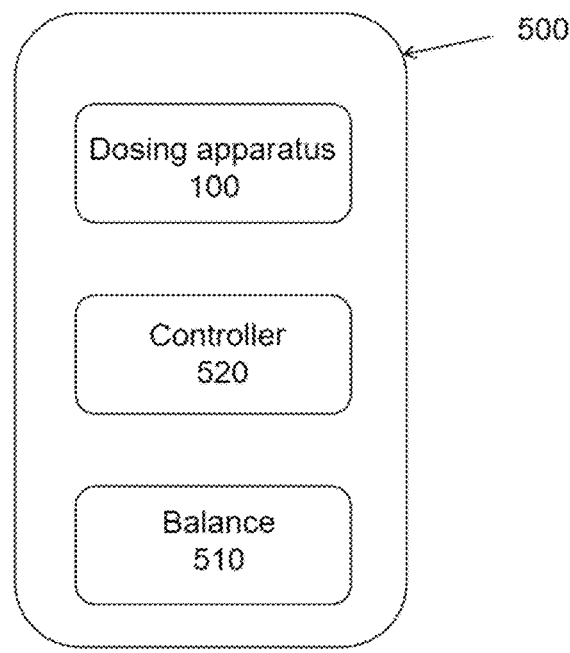
FIG. 20 is a schematic block diagram of a dosing system in an embodiment of the present disclosure.

Referring to FIG. 20, in some embodiments, the dosing system 500 may include a dosing apparatus 100, a balance 510, and a controller 520. Wherein, the dosing apparatus 100 is adapted to deliver the reagent within the external container 211 into a reagent bottle outside the container 211; the balance 510 is disposed below the reagent bottle and is adapted to weigh a mass of the reagent delivered into the reagent bottle; and the controller 520 is coupled to the balance 510 and the dosing apparatus 100, respectively, and is adapted to regulate a speed of the movement of the conveying mechanism based on the mass weighed by the balance 510.

In particular embodiments, the dosing apparatus 100 in this dosing system 500 may include the dosing apparatus 100 provided in the first aspect of the embodiments of the present disclosure.

In some embodiments, the conveying mechanism may include a conveyor belt 127. In this case, the controller 520 may be coupled to a driving apparatus of the conveyor belt 127 and regulate a drive speed of the conveyor belt 127 via the driving apparatus.

In other embodiments, the conveying mechanism may include a first spiral rod 112. In this case, the controller 520 may be coupled to a driving apparatus 310 of the first spiral rod 112 and regulate the speed of the first spiral rod 112 through the driving apparatus 310.

In some embodiments, when the mass of the reagent delivered to the reagent bottle is not yet close to a target mass of the reagent, the first spiral rod 112 may be made to rotate at a high rotational speed so that the reagent is quickly delivered to the reagent bottle. And when the mass of the reagent delivered to the reagent bottle is close to the target mass of the reagent, the first spiral rod 112 can be made to rotate at a low rotational speed so that the reagent is slowly delivered to the reagent bottle, in order to prevent the problem of rapid delivery of the reagent, which leads to the problem of delivering an overdose of the reagent, from arising.

It will be appreciated that the target mass of the reagent represents the mass of the reagent desired to be weighed.

Adopting the above technical solution, by adjusting the rotational speed of the first spiral rod 112 in the dosing apparatus 100 in conjunction with the weighing feedback, the mass flow rate of the output reagent can be controlled, so as to better realize accurate weighing and sampling of the reagent.

It has been proved by a large number of tests that by adopting the dosing apparatus 100, the dosing set 200, the dosing head 300, the dosing equipment 400, and the dosing system 500 provided in the embodiments of the present disclosure, the mass flow rate of the output reagent is controllable and remains constant at a constant rate of sampling, and the accuracy of the sampling can thus be effectively ensured.

Although specific embodiments of the present disclosure have been described above, these embodiments are not intended to limit the scope of the disclosure of the present disclosure, even where a single embodiment is described only in relation to a particular feature. The examples of features provided in the present disclosure are intended to be illustrative and not limiting, unless a different representation is made. In specific embodiments, the technical features of one or more dependent claims may be combined with the technical features of the independent claims according to practical needs and where technically feasible, and the technical features of the corresponding claims may be combined in any appropriate manner rather than only by the particular combinations enumerated in the claims.

Although the invention is disclosed as above, the invention is not limited thereto. Any person skilled in the art may make various changes and modifications without departing from the spirit and scope of the present disclosure, and therefore the scope of protection of the present disclosure shall be subject to the scope limited by the claims.

The invention claimed is:

1. A dosing set (200), comprising:
   a container (211) which is adapted to hold reagent, wherein the container (211) is capable of being driven to rotate;
   a dosing apparatus (100), which is at least partially provided within the container (211), wherein the dosing apparatus (100) comprises:
      a first channel (111), wherein the first channel (111) has a first channel first opening (111a) connecting with the container (211) to allow the reagent inside the container (211) to enter the first channel (111), and a first channel second opening (111b) which is in connection with outside of the first channel (111) to allow the reagent to leave the first channel (111); and
      at least one first spiral rod (112) provided within the first channel (111), wherein the least one first spiral rod (112) is configured to be driven to rotate in a first direction, so as to deliver the reagent from the first channel (111) to the first channel second opening (111b), and wherein a mass flow rate of the reagent leaving through the first channel second opening (111b) is controlled by adjusting the rotational speed of the first spiral rod (112);
   wherein a rotational speed of the container (211) is less than the rotational speed of the first spiral rod (112).

2. The dosing set (200) according to claim 1, further comprising a driving apparatus (310); wherein the driving apparatus (310) comprises a driving motor (311), a second gear (312) coaxially coupled to the driving motor (311), and a third gear (313) and a fourth gear (314) both in meshing transmission connection with the second gear (312); wherein the third gear (313) is coaxially connected to the first spiral rod (112); wherein the fourth gear (314) is coaxially connected to the container (211); wherein the second gear (312) is adapted to rotate under the drive of the driving motor (311) and drive the third gear (313) to drive the first spiral rod (112) to rotate in the first direction at the first speed, and drive the fourth gear (314) to drive the container (211) to rotate in the first direction at a second speed, wherein a diameter ratio of the third gear (313) to the fourth gear (314) is equal to a speed ratio of the second speed to the first speed.

3. The dosing set (200) according to claim 1, wherein the container (211) comprises a container opening, and wherein the dosing set (200) further comprises a connector structure (220) which is adapted to connect the container opening and the dosing apparatus (100); wherein the connector structure (220) comprises a connector (221) penetrating along the axial direction of the container opening, and a support member (222) and a bearing member (223) sequentially socketed within the connector (221); wherein the connector (221) is removably socketed around an outer periphery of the container opening; wherein a gap is provided between the connector (221) and the support member (222) to receive a sidewall (211a) of the container opening; wherein the bearing member (223) is provided outside the dosing apparatus (100); wherein a first sealing ring (224) and a second sealing ring (225) are provided between the support member (222) and the bearing member (223) and between the support member (222) and the sidewall (211a) of the container opening, respectively, so that the connector structure (220) is seal-connected to the dosing apparatus (100) and the container opening, respectively.

4. The dosing set (200) according to claim 1, further comprising a second channel (113) and at least one second spiral rod (114) provided within the second channel (113); wherein the second channel (113) has a second channel first opening (113a) in connection with the first channel second opening (111b) to allow the reagent within the first channel (111) to enter the second channel (113), a second channel second opening (113b) in connection with the outside to allow the reagent to leave the second channel (113), and a second channel third opening (113c) in connection with the container (211) to allow the reagent to leave the second channel (113) and return to the container (211); wherein the at least one second spiral rod (114) is in meshing transmission connection with the first spiral rod (112) to rotate in a second direction as driven by the first spiral rod (112), to convey the reagent within the second channel (113) to the second channel second opening (113b) and the second channel third opening (113c); and wherein the second direction is opposite to the first direction.

5. The dosing set (200) according to claim 4, wherein the first channel first opening (111a) is provided in a mid-side portion of the first channel (111); the first channel second opening (111b) is provided in a lower side portion of the first channel (111); the second channel first opening (113a) is provided in a lower side portion of the second channel (113); the second channel second opening (113b) is provided at a bottom end of the second channel (113); and the second channel third opening (113c) is provided at an upper side portion of the second channel (113).

6. The dosing set (200) according to claim 4, wherein a tip of the first spiral rod (112) extends outside the first channel (111); wherein a tip of the second spiral rod (114) extends outside the second channel (113); wherein the dosing set (200) further comprises an end-face cam (115) coaxially connected with the tip of the first spiral rod (112), and a first gear (116) coaxially connected with the tip of the second spiral rod (114); wherein the end-face cam (115) is engaged to the first gear (116); wherein the end-face cam (115) is adapted to be driven by the first spiral rod (112) to rotate in the first direction and to drive the first gear (116) to rotate the second spiral rod (114) in the second direction when the first spiral rod (112) rotates in the first direction.

7. The dosing set (200) according to claim 6, further comprising a top cover (117) disposed above the first channel (111) and the second channel (113), and an elastic member (118) and a cam fitting member (119) disposed sequentially between the top cover (117) and the end-face cam (115) and adapted to move only in the axis direction of the first spiral rod (112); wherein the cam fitting member (119) is adapted to reciprocate along the axial direction of the first spiral rod (112) as driven by the end-face cam (115) when the end-face cam (115) is rotating in the first direction, and to limit the rotation of the end-face cam (115) in the second direction when the end-face cam (115) is to rotate in the second direction; wherein the elastic member (118) is adapted to compress as well as release compression under the action of the cam fitting member (119) during rotation of the end-face cam (115) in the first direction.

8. The dosing set (200) according to claim 7, wherein the end-face cam (115) comprises a pair of first beveled surfaces (115a) and a pair of first vertical surfaces (115b) at an end facing the cam fitting member (119); wherein the cam fitting member (119) comprises a pair of second beveled surfaces (119*a*) and a pair of second vertical surfaces (119*b*) at an end facing the end-face cam (115); wherein the pair of first beveled surfaces (115*a*) are mated with the pair of second beveled surfaces (119*a*), and the pair of first vertical surfaces (115*b*) are mated with the pair of second vertical surfaces (119*b*); wherein when the end-face cam (115) rotates in the first direction, the pair of first vertical surfaces (115*b*) are away from the pair of second vertical surfaces (119*b*) with which they are mated, and the pair of first beveled surfaces (115*a*) rotate with respect to the pair of second beveled surfaces (119*a*) with which they are mated and push the cam fitting member (119) to move back and forth in the axis direction of the first spiral rod (112); and wherein when the end-face cam (115) is to rotate in the second direction, the pair of second vertical surfaces (119*b*) block the pair of first vertical surfaces (115*b*) with which they are mated from rotating so as to limit the end-face cam (115) from rotating in the second direction.

9. The dosing set (200) according to claim 7, wherein the cam fitting member (119) comprises a guide block (119*c*) provided on a side portion, wherein a side surface of the top cover (117) has a groove extending in the axial direction of the first spiral rod (112) to accept the guide block (119*c*), and allow the guide block (119*c*) to move back and forth in the axial direction of the first spiral rod (112).

10. The dosing set (200) according to claim 7, wherein the tip of the first spiral rod (112) sequentially passes through the end-face cam (115) and the cam fitting member (119) and further extends above the cam fitting member (119); wherein the cam fitting member (119) has a support edge (119*d*) provided on its inner ring; wherein elastic member (118) comprises a spring; wherein the spring is sleeved on the outside of the first spiral rod (112) and two ends of the spring resist the inner end surface of the top cover (117) and the support edge (119*d*), respectively, so that the spring is adapted to be compressed when the cam fitting member (119) is moved upwardly in the axial direction of the first spiral rod (112), and to be released from compression so that the cam fitting member (119) moves downwardly along the axial direction of the first spiral rod (112), thereby enabling the cam fitting member (119) to reciprocate along the axial direction of the first spiral rod (112).

11. The dosing set (200) according to claim 4, further comprising an outlet valve (120) adapted to close as well as open the second channel second opening (113*b*), wherein the outlet valve (120) is rotationally connected to an end of the second channel (113) proximate to the second channel second opening (113*b*), and is adapted to be driven to rotate in a third direction to close the second channel second opening (113*b*), and to rotate in a fourth direction to open the second channel second opening (113*b*); wherein, the fourth direction is opposite to the third direction.

12. The dosing set (200) according to claim 11, wherein the outlet valve (120) comprises a closure portion (121), wherein the closure portion (121) comprises a sealing member adapted to be disposed facing the second channel second opening (113*b*); wherein the sealing member is adapted to move closer to and face the second channel second opening (113*b*) as the outlet valve (120) rotates in the third direction, so as to be suitable for closing the second channel second opening (113*b*) by embedding in the second channel second opening (113*b*), and the sealing member is also adapted to open the second channel second opening (113*b*) by disengaging from and moving away from the second channel second opening (113*b*) as the outlet valve (120) rotates in the fourth direction.

13. The dosing set (200) according to claim 12, further comprising a hook block (123) disposed on an outer side of the second channel (113), wherein the outlet valve (120) comprises a hook portion (122) coupled to the closure portion (121) and bent relative to the closure portion (121) so that the hook portion (122) is disposed facing a side portion of the second channel (113); wherein the hook portion (122) comprises a hook slot (122*a*) facing the hook block (123); wherein the hook slot (122*a*) is adapted to move toward the hook block (123) when the outlet valve (120) rotates in a third direction, and to be limited by the hook block (123) when reaching the hook block (123), so that the sealing member is set facing the second channel second opening (113*b*), and wherein the hook slot (122*a*) is also adapted to move away from the hook block (123) when the outlet valve (120) rotates in the fourth direction.

14. The dosing set (200) according to claim 13, wherein when the hook slot (122*a*) is limited by the hook block (123), the hook slot (122*a*) abuts against a bottom of the hook block (123), to limit upward movement of the outlet valve (120).

15. The dosing set (200) according to claim 2, further comprising a second channel (113) and at least one second spiral rod (114) provided within the second channel (113); wherein the second channel (113) has a second channel first opening (113*a*) in connection with the first channel second opening (111*b*) to allow the reagent within the first channel (111) to enter the second channel (113), a second channel second opening (113*b*) in connection with the outside to allow the reagent to leave the second channel (113), and a second channel third opening (113*c*) in connection with the container (211) to allow the reagent to leave the second channel (113) and return to the container (211); wherein the at least one second spiral rod (114) is in meshing transmission connection with the first spiral rod (112) to rotate in a second direction as driven by the first spiral rod (112), to convey the reagent within the second channel (113) to the second channel second opening (113*b*) and the second channel third opening (113*c*); and wherein the second direction is opposite to the first direction.

16. The dosing set (200) according to claim 3, further comprising a second channel (113) and at least one second spiral rod (114) provided within the second channel (113); wherein the second channel (113) has a second channel first opening (113*a*) in connection with the first channel second opening (111*b*) to allow the reagent within the first channel (111) to enter the second channel (113), a second channel second opening (113*b*) in connection with the outside to allow the reagent to leave the second channel (113), and a second channel third opening (113*c*) in connection with the container (211) to allow the reagent to leave the second channel (113) and return to the container (211); wherein the at least one second spiral rod (114) is in meshing transmission connection with the first spiral rod (112) to rotate in a second direction as driven by the first spiral rod (112), to convey the reagent within the second channel (113) to the second channel second opening (113*b*) and the second channel third opening (113*c*); and wherein the second direction is opposite to the first direction.

17. The dosing set (200) according to claim 8, wherein the cam fitting member (119) comprises a guide block (119*c*) provided on a side portion, wherein a side surface of the top cover (117) has a groove extending in the axial direction of the first spiral rod (112) to accept the guide block (119*c*), and allow the guide block (119*c*) to move back and forth in the axial direction of the first spiral rod (112).

\* \* \* \* \*